US012452612B2

(12) United States Patent
Yan et al.

(10) Patent No.: US 12,452,612 B2
(45) Date of Patent: Oct. 21, 2025

(54) METHODS AND SYSTEMS FOR CONFIGURING BONE CONDUCTION HEARING AIDS

(71) Applicant: SHENZHEN SHOKZ CO., LTD., Guangdong (CN)

(72) Inventors: Bingyan Yan, Shenzhen (CN); Bocheng Li, Shenzhen (CN); Huifang Tang, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 269 days.

(21) Appl. No.: 18/323,665

(22) Filed: May 25, 2023

(65) Prior Publication Data

US 2023/0300544 A1 Sep. 21, 2023

Related U.S. Application Data

(63) Continuation of application No. PCT/CN2021/090136, filed on Apr. 27, 2021.

(51) Int. Cl.
*H04R 25/00* (2006.01)

(52) U.S. Cl.
CPC ........... *H04R 25/50* (2013.01); *H04R 25/353* (2013.01); *H04R 2460/13* (2013.01)

(58) Field of Classification Search
CPC ............ H04R 2225/43; H04R 2225/55; H04R 2430/01; H04R 2430/03; H04R 2460/13; H04R 25/353; H04R 25/356; H04R 25/50; H04R 25/55; H04R 25/554; H04R 25/606; H04R 25/70; H04R 25/35; H04R 25/48; H04R 3/00
USPC ........................................................... 381/60
See application file for complete search history.

(56) References Cited

U.S. PATENT DOCUMENTS

2005/0114127 A1 5/2005 Rankovic
2008/0292122 A1 11/2008 Nordahn et al.
2009/0138062 A1 5/2009 Balslev
2011/0071339 A1 3/2011 Rosenbom
(Continued)

FOREIGN PATENT DOCUMENTS

CN 104038879 A 9/2014
CN 107569236 A 1/2018
(Continued)

OTHER PUBLICATIONS

International Search Report in PCT/CN2021/090136 mailed on Dec. 28, 2021, 7 pages.
(Continued)

*Primary Examiner* — Phylesha Dabney
(74) *Attorney, Agent, or Firm* — METIS IP LLC

(57) ABSTRACT

Disclosed is methods and systems for configuring bone conduction hearing aids. The method may comprise: obtaining hearing loss data of a wearer; determining a reference output parameter of the bone conduction hearing aid at each sound level in each frequency band based on the hearing loss data; obtaining an adjustment value of the reference output parameter at the each sound level in the each frequency band, wherein the adjustment value is at least related to the frequency band; and configuring the bone conduction hearing aid based on the reference output parameter and the adjustment value at the each sound level in the each frequency band.

20 Claims, 11 Drawing Sheets

(56) References Cited

U.S. PATENT DOCUMENTS

| | | | |
|---|---|---|---|
| 2012/0189130 A1 | 7/2012 | Lee et al. | |
| 2016/0219380 A1 | 7/2016 | Meyer et al. | |
| 2019/0356989 A1 | 11/2019 | Li et al. | |
| 2020/0065058 A1 | 2/2020 | Clark | |
| 2020/0092633 A1 | 3/2020 | Zhang et al. | |

FOREIGN PATENT DOCUMENTS

| | | | |
|---|---|---|---|
| CN | 108024178 | A | 5/2018 |
| CN | 109246567 | A | 1/2019 |
| CN | 109511070 | A | 3/2019 |
| CN | 106921926 | B | 11/2020 |
| CN | 112383870 | A | 2/2021 |
| JP | H05244696 | A | 9/1993 |
| JP | 2012147077 | A | 8/2012 |
| JP | 2014236439 | A | 12/2014 |
| JP | 2016116202 | A | 6/2016 |
| KR | 101845342 | B1 | 4/2018 |
| WO | 2005052913 | A2 | 6/2005 |
| WO | 2012016527 | A1 | 2/2012 |

OTHER PUBLICATIONS

Office Action in Taiwan Application No. 111115552 mailed on May 24, 2023, 20 pages.

The Extended European Search Report in European Application No. 21938249.6 mailed on Feb. 7, 2024, 10 pages.

Notification to Grant Patent Right for Invention in Japanese Application No. 2023-543182 mailed on Oct. 7, 2024, 6 pages.

Notice of Preliminary Rejection in Korean Application No. 10-2023-7023916 mailed on Jun. 9, 2025, 9 pages.

| Wearer 1 Speech recognition rate test data table (Sound level of test sound field 35 dB HL) | | | | | | |
|---|---|---|---|---|---|---|
| | 125 | 250 | 500 | 764 | Speech recognition rate | Vibration sensation and volume |
| Before hearing aid | - | - | - | - | 50% | - |
| Initial configura tion | 0 | 0 | 0 | 0 | 70% | Slight vibration when the wearer speaks |
| Test 1 | -5 | -3 | -1 | 0 | 75% | Slight vibration when the wearer speaks |
| Test 2 | -6 | -5 | -3 | -1 | 75% | Basically no vibration when the wearer speaks |
| Test 3 | -10 | -8 | -4 | -1 | 65% | No vibration when the wearer speaks |
| Test 4 | -12 | -10 | -6 | -2 | 50% | Low volume |
| Test 5 | -15 | -13 | -8 | -2 | 50% | Low volume |
| Test 6 | -17 | -15 | -9 | -3 | 50% | Low volume |

FIG. 9

| Wearer 2 Speech recognition rate test data table (Sound level of test sound field 45 dB HL) | | | | | | |
|---|---|---|---|---|---|---|
| | 125 | 250 | 500 | 764 | Speech recognition rate | Vibration sensation and volume |
| Before hearing aid | - | - | - | - | 50% | - |
| Initial configura tion | 0 | 0 | 0 | 0 | 80% | The wearer senses vibration when speaking, and the volume is OK |
| Test 1 | -5 | -5 | -3 | -1 | 80% | The wearer senses vibration when speaking, and the volume is OK |
| Test 2 | -5 | -5 | -3 | -1 | 75% | The vibration is comfortable, but the volume is low |
| Test 3 | -10 | -8 | -4 | -1 | 75% | The vibration is comfortable, but the volume is low |
| Test 4 | -12 | -10 | -6 | -2 | 70% | The vibration is comfortable, but the volume is low |
| Test 5 | -15 | -12 | -7 | -2 | 75% | The vibration is comfortable, but the volume is low |
| Test 6 | -17 | -15 | -10 | -3 | 70% | Low volume |

FIG. 10

| Wearer 3 Speech recognition rate test data table (Sound level of test sound field 45 dB HL) | | | | | | |
|---|---|---|---|---|---|---|
| | 125 | 250 | 500 | 764 | Speech recognition rate | Vibration sensation and volume |
| Before hearing aid | - | - | - | - | 35% | - |
| Initial configura tion | 0 | 0 | 0 | 0 | 65% | The wearer senses vibration when speaking |
| Test 1 | -5 | -3 | -1 | 0 | 65% | The wearer senses vibration when speaking |
| Test 2 | -8 | -5 | -2 | 0 | 65% | The wearer senses no vibration basically when speaking, and the volume is OK |
| Test 3 | -10 | -7 | -4 | -1 | 65% | The wearer senses no vibration basically when speaking, and the volume is OK |
| Test 4 | -12 | -10 | -6 | -2 | 60% | The wearer senses no vibration when speaking, but the volume is small |
| Test 5 | -15 | -12 | -7 | -2 | 60% | The wearer senses no vibration when speaking, but the volume is small |
| Test 6 | -17 | -15 | -10 | -3 | 55% | The wearer senses no vibration when speaking, but the volume is small |

FIG. 11

METHODS AND SYSTEMS FOR CONFIGURING BONE CONDUCTION HEARING AIDS

CROSS-REFERENCE TO RELATED APPLICATION

This application is a Continuation of International Patent Application No. PCT/CN2021/090136, filed on Apr. 27, 2021, the entire contents of which are hereby incorporated by reference.

TECHNICAL FIELD

The present disclosure relates to the field of bone conduction hearing aids, and in particular to methods and systems for configuring bone conduction hearing aids.

BACKGROUND

Bone conduction hearing aids are hearing aids designed and manufactured using bone conduction technology. The bone conduction hearing aids may be bone conduction hearing aid equipment or bone conduction hearing aid headphones. The bone conduction hearing aids mainly amplify external sound information and convert the external sound information into mechanical vibration, and send the mechanical vibration including external sound information to the auditory center of the cerebral cortex through the human skull, bone labyrinth, inner ear lymph fluid, corti, and auditory nerve in the form of mechanical vibration. Compared with traditional air conduction hearing aids, the sound wave signals of bone conduction hearing aids may be transmitted directly to the auditory nerve through bones without passing through the external auditory canal and eardrum, thereby avoiding the pressure and ear blocking effect caused by the traditional air conduction hearing aids blocking the ear canal. Besides, the bone conduction hearing aids make the wearer have a comfortable wearing experience. In addition, the bone conduction hearing aids do not need to be implanted in the ear, and may effectively avoid ear canal inflammation. Therefore, the bone conduction hearing aids are increasingly used by hearing-impaired patients.

Since the bone conduction hearing aids make the wearer hear the sound by transmitting the sound through vibration, severe vibrations may exist during use, which will affect the wearing experience of the wearer. In addition, small vibrations will affect the hearing effect of the wearer. Therefore, it is desirable to provide methods for configuring a bone conduction hearing aid to improve the wearing experience caused by the severe vibrations of the bone conduction hearing aid without affecting the hearing effect of the wearer.

SUMMARY

One of the embodiments of the present disclosure provides a method for configuring a bone conduction hearing aid. The method may comprise: obtaining hearing loss data of a wearer; determining a reference output parameter of the bone conduction hearing aid at each sound level in each frequency band based on the hearing loss data; obtaining an adjustment value of the reference output parameter at the each sound level in the each frequency band, wherein the adjustment value is at least related to the frequency band; and configuring the bone conduction hearing aid based on the reference output parameter and the adjustment value at the each sound level in the each frequency band.

In some embodiments, the configuring the bone conduction hearing aid based on the reference output parameter and the adjustment value at the each sound level in the each frequency band may include: in a frequency band within a range from 0 Hz to 625 Hz, reducing the reference output parameter based on the adjustment value.

In some embodiments, the adjustment values may be the same at different sound levels in a same frequency band.

In some embodiments, in a frequency band within a range from 0 Hz to 625 Hz, the adjustment value may be within a range of 1 dB-12 dB.

In some embodiments, in a frequency band within a range from 0 Hz to 125 Hz, the adjustment value may be within a range of 5 dB-12 dB; in a frequency band within a range from 125 Hz to 375 Hz, the adjustment value may be within a range of 3 dB-9 dB; or in a frequency band within a range from 375 Hz to 625 Hz, the adjustment value may be within a range of 1 dB-6 dB.

In some embodiments, in a frequency band within a range from 0 Hz to 125 Hz, the adjustment value is within a range of 5 dB-7 dB; in a frequency band within a range from 125 Hz to 375 Hz, the adjustment value may be within a range of 3 dB-5 dB; or in the frequency band within a range from 375 Hz to 625 Hz, the adjustment value may be within a range of 1 dB-3 dB.

In some embodiments, in a frequency band within a range from 0 Hz to 125 Hz, the adjustment value may be within a range of 10 dB-12 dB; in a frequency band within a range from 125 Hz to 375 Hz, the adjustment value may be within a range of 7 dB-9 dB; or in a frequency band within a range from 375 Hz to 625 Hz, the adjustment value may be within a range of 4 dB-6 dB.

In some embodiments, the adjustment values may be different at different sound levels in a same frequency band.

In some embodiments, the obtaining the adjustment value of the reference output parameter at the each sound level in the each frequency band may include: determining a first threshold corresponding to the each sound level in the each frequency band, wherein the first threshold is related to a vibration degree that the wearer senses at the each sound level in the each frequency band; determining a second threshold corresponding to the each sound level in the each frequency band, wherein the second threshold is related to a speech recognition rate of the wearer at the each sound level in the each frequency band; and determining the adjustment value based on the reference output parameter, the first threshold, and the second threshold.

In some embodiments, the determining the adjustment value based on the reference output parameter, the first threshold, and the second threshold may include: for a reference output parameter at a certain sound level of the each sound level in a certain frequency band of the each frequency band: obtaining a comparison value by subtracting the first threshold from the reference output parameter; obtaining a first comparison result by comparing the comparison value with the second threshold; and determining the adjustment value corresponding to the reference output parameter based on the first comparison result.

In some embodiments, the determining the adjustment value corresponding to the reference output parameter based on the first comparison result may include: designating the adjustment value as 0 dB when the comparison value is less than or equal to 0; designating the adjustment value as the comparison value when the comparison value is greater than 0 and less than or equal to the second threshold; and designating the adjustment value as the second threshold value when the comparison value is greater than the second threshold.

In some embodiments, in a frequency band within a range from 0 Hz to 125 Hz, the first threshold may be within a range of 48 dB-52 Db.

In some embodiments, in a frequency band within a range from 125 Hz to 375 Hz, the first threshold may be within a range of 49 dB-54 dB.

In some embodiments, in a frequency band within a range from 375 Hz to 625 Hz, the first threshold may be within a range of 50 dB-55 dB.

In some embodiments, in a frequency band within a range from 0 Hz to 125 Hz, the second threshold may be within a range of 5 dB-10 dB.

In some embodiments, in a frequency band within a range from 125 Hz to 375 Hz, the second threshold may be within a range of 3 dB-7 dB.

In some embodiments, in a frequency band within a range from 375 Hz to 625 Hz, the second threshold may be within a range of 1 dB-4 dB.

In some embodiments, the configuring the bone conduction hearing aid device based on the reference output parameter and the adjustment value at the each sound level in the each frequency band may include: configuring the bone conduction hearing aid based on the reference output parameter and the adjustment value at the each sound level in the each frequency band using a multi-channel wide dynamic range compression system.

In some embodiments, the obtaining the adjustment value of the reference output parameter at the each sound level in the each frequency band may include: determining a second comparison result by comparing the reference output parameter with the first threshold, wherein the first threshold is related to a vibration degree that the wearer senses at the each sound level in the each frequency band; and determining the adjustment value corresponding to the reference output parameter based on the second comparison result.

In some embodiments, the adjustment value may include a gain reduction value of the multi-channel wide dynamic range compression system when at least one sound level of the each sound level is greater than a sound level threshold; and the determining the adjustment value corresponding to the reference output parameter based on the second comparison result may include: designating the gain reduction value as 0 dB when the reference output parameter is less than or equal to the first threshold; and designating the gain reduction value as a difference between the first threshold and the reference output parameter when the reference output parameter is greater than the first threshold.

In some embodiments, the adjustment value may include a reduction value of a output limit of the multi-channel wide dynamic range compression system when at least one sound level of the each sound level is greater than a sound level threshold; and the determining the adjustment value corresponding to the reference output parameter based on the second comparison result may include: designating the reduction value of the output limit as 0 dB when the reference output parameter is less than or equal to the first threshold; and designating the reduction value of the output limit as a value greater than 0 dB when the reference output parameter is greater than the first threshold.

One of the embodiments of the present disclosure provides a device for configuring a bone conduction hearing aid. The device may comprise: an obtaining module configured to obtain hearing loss data of a wearer; a reference output parameter determination module configured to determine a reference output parameter of the bone conduction hearing aid at each sound level in each frequency band based on the hearing loss data; an adjustment value determination module configured to obtain an adjustment value of the reference output parameter at the each sound level in the each frequency band; and a configuration module configured to configure the bone conduction hearing aid based on the reference output parameter and the adjustment value at the each sound level in the each frequency band.

One of the embodiments of the present disclosure provides a system for configuring a bone conduction hearing aid. The system may comprise: a processing device; and a storage device communicating with the processing device, configured to store instructions, wherein when performing the stored instructions, the processing device may implement the method for configuring the bone conduction hearing aid of any one of the technical solutions.

One of the embodiments of the present disclosure provides a non-transitory computer-readable storage medium storing computer instructions, wherein when reading the computer instructions in the non-transitory computer-readable storage medium, a computer may implement the method for configuring the bone conduction hearing aid of any one of the technical solutions.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein:

FIG. 9 is a diagram illustrating experimental results of a speech recognition rate test performed on a wearer 1;

FIG. 10 is a diagram illustrating experimental results of a speech recognition rate test performed on a wearer 2; and FIG. 11 is a diagram illustrating experimental results of a speech recognition rate test performed on a wearer 3.

DETAILED DESCRIPTION

Figure 1:
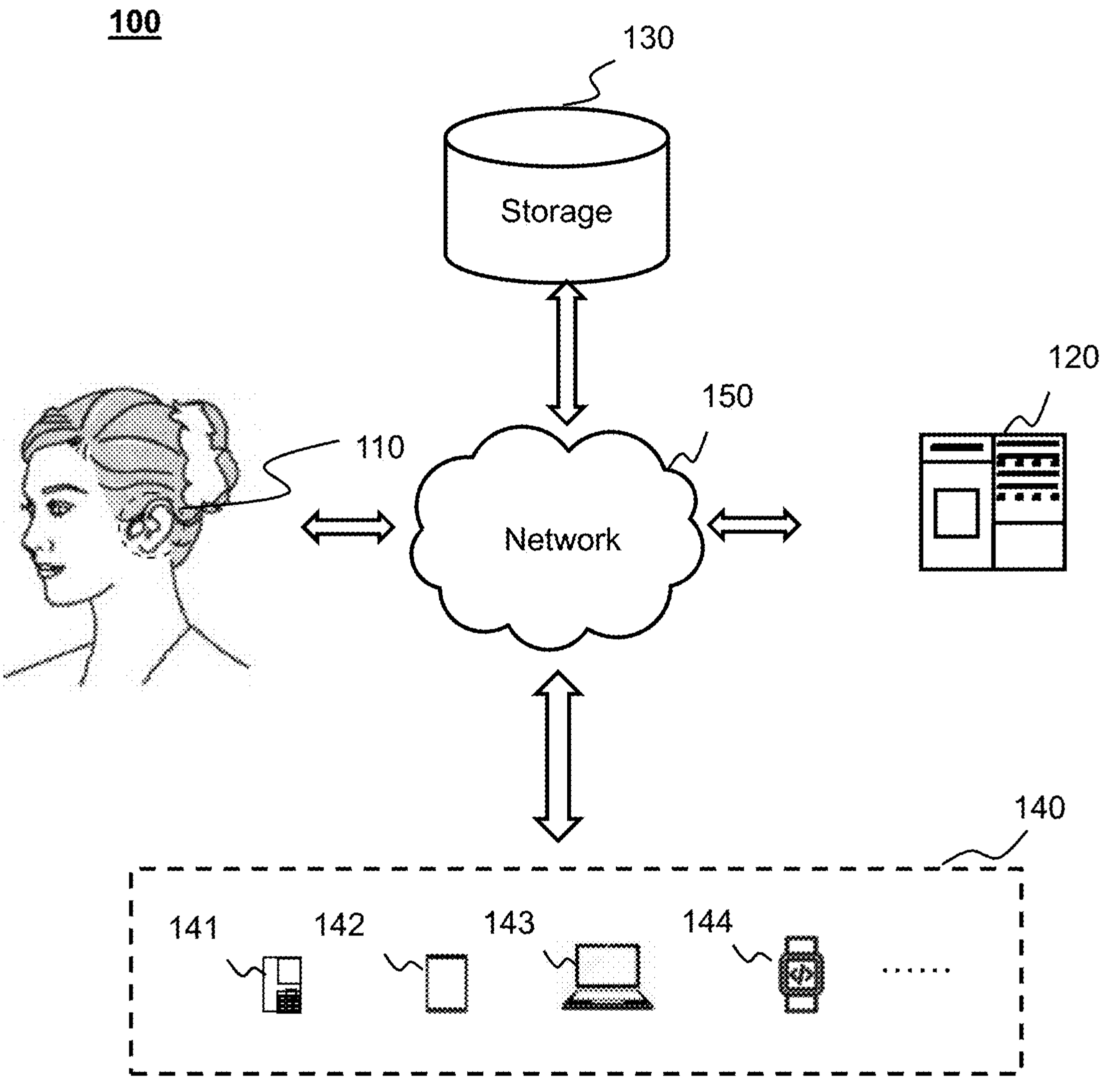
FIG. 1 is a schematic diagram illustrating an exemplary system for configuring a bone conduction hearing aid according to some embodiments of the present disclosure.

In order to more clearly illustrate the technical solutions related to the embodiments of the present disclosure, brief introduction of the drawings referred to the description of the embodiments is disposed below. Obviously, drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections or assemblies of different levels. However, words may be replaced by other expressions if they serve the same purpose.

As used in the disclosure and the appended claims, the singular forms "a," "an," and "the" include plural referents unless the content clearly dictates otherwise. Generally speaking, the terms "comprise" and "include" only imply that the clearly identified steps and elements are included, and these steps and elements do not constitute an exclusive list, and the method or apparatus may also include other steps or elements.

The flowcharts used in the present disclosure illustrate operations that systems implement according to some embodiments of the present disclosure. It should be understood that the preceding or following operations are not necessarily performed in the exact order. On the contrary, each step may be processed in reverse order or simultaneously. At the same time, other operations may also be added to these processes, and one or more operations may be removed from these process.

FIG. 1 is a schematic diagram illustrating an exemplary system for configuring a bone conduction hearing aid according to some embodiments of the present disclosure. As shown in FIG. 1, a system 100 for configuring a bone conduction hearing aid may comprise a bone conduction hearing aid 110, a processing device 120, a storage 130, one or more terminals 140, and a network 150. In some embodiments, the bone conduction hearing aid 110, the processing device 120, the storage 130 and/or the terminals 140 may be connected and/or communicate with each other via a wireless connection (e.g., the network 150), a wired connection, or a combination thereof. The connections between components in the system 100 for configuring the bone conduction hearing aid may vary. Merely by way of example, the bone conduction hearing aid 110 may be connected to processing device 120 via the network 150, as shown in FIG. 1. As another example, the bone conduction hearing aid 110 may be directly connected to the processing device 120. As another example, the storage 130 may be connected to the processing device 120 via the network 150, as shown in FIG. 1, or directly connected to the processing device 120. As another example, the terminals 140 may be connected to the processing device 120 via the network 150, as shown in FIG. 1, or directly connected to the processing device 120.

The bone conduction hearing aid 110 may be configured to obtain sound information (e.g., ambient sound, wearer's voice, audio files obtained from other devices, etc.) and process and convert the obtained sound information into a vibration signal, and transmit the vibration signal to an auditory center of a wearer through the bones of the wearer, so that the wearer can hear the sound information carried by the vibration signal. Specifically, the bone conduction hearing aid may be a bone conduction hearing aid, or may be a bone conduction hearing aid headphone. In the present disclosure, the bone conduction hearing aid may be mainly used as an example for illustration.

In some embodiments, the bone conduction hearing aid 110 (e.g., the bone conduction hearing aid) may include a sound pickup component, a loudspeaker component, or the like. The sound pickup component may be configured to pick up sound information (also referred to as a first vibration signal, e.g., the ambient sound, the wearer's voice) and process and convert the picked up first vibration signal into an electrical signal carrying the sound information. The loudspeaker component may convert the electrical signal carrying the sound information obtained by the sound pickup component into a second vibration signal carrying the sound information and transmit the second vibration signal carrying the sound information to the auditory center of the wearer. Detailed descriptions regarding the bone conduction hearing aid 110 may be found in other descriptions in the present disclosure (e.g., FIG. 2 and detailed descriptions thereof).

In some embodiments, for different wearers of the bone conduction hearing aid, the configurations of the bone conduction hearing aid may be different because the wearers have different hearing levels (i.e., hearing loss levels). As described in the present disclosure, the configurations of the bone conduction hearing aid refer to parameter values (also referred to as parameters) related to an intensity of a sound signal output by the bone conduction hearing aid or a determination process thereof, and thus the bone conduction hearing aid may output the sound signal based on the parameter values. The parameter values related to the intensity of the signal output by the bone conduction hearing aid may include a gain value (dB), an analog output value (dB), or the like. In some embodiments, the gain value may be a value at which the hearing aid amplifies the intensity of the sound signal, and the analog output value may be an output signal intensity value simulated by the hearing aid according to an input sound signal parameter (e.g., a sound signal intensity value). For example, the analog output value may be equal to a result of a sound signal input value (i.e., an intensity value, in dB) plus the gain value (in dB). The system 100 for configuring the bone conduction hearing aid may determine the configuration of the bone conduction hearing aid corresponding to the hearing level of the wearer according to the hearing level of the wearer. Based on this configuration, the bone conduction hearing aid 110 may process and output the obtained sound information (e.g., ambient sound, wearer's voice, audio files obtained in other devices, etc.), to make the wearer hear the sound.

The processing device 120 may process data and/or information obtained from the bone conduction hearing aid 110, the storage 130, or the terminals 140. For example, the processing device 120 may obtain the hearing loss data of the wearer of the bone conduction hearing aid 110. As another example, the processing device 120 may determine a reference output parameter of the bone conduction hearing aid 110 at each sound level in each frequency band based on the hearing loss data. As another example, the processing device 120 may obtain an adjustment value of the reference output parameter. As another example, the processing device 120 may configure the bone conduction hearing aid 110 based on the reference output parameter and the adjustment value at each sound level in each frequency band.

In some embodiments, the processing device 120 may be a single server or a server group. The server group may be centralized or distributed. In some embodiments, the processing device 120 may be local or remote. For example, the processing device 120 may access the information or data stored in the bone conduction hearing aid 110, the terminals 140, or the storage 130 via the network 150. As another example, the processing device 120 may access the stored information or data by directly connecting to the bone conduction hearing aid 110, the terminals 140, or the storage 130. In some embodiments, the processing device 120 may be implemented on a cloud platform. Merely by way of example, the cloud platform may include a private cloud, a public cloud, a hybrid cloud, a community cloud, a distributed cloud, an internal clouds, a multi-layer cloud, or the like, or any combination thereof. In some embodiments, the processing device 120 may be implemented on a computing device. In some embodiments, the processing device 120 or a part of the processing device 120 may be integrated into the bone conduction hearing aid 110. In some embodiments, the processing device 120 or a portion of processing device 120 may be integrated into the terminals 140.

The storage 130 may store data, instructions, or any other information. In some embodiments, the storage 130 may store data obtained from the terminals 140 or the processing device 120. In some embodiments, the storage 130 may store data or instructions that the processing device 120 may perform or be used to perform the exemplary methods described herein. In some embodiments, the storage 130 may include a mass storage device, a removable storage device, a volatile read-write memory, a read-only memory (ROM), or the like, or any combination thereof. In some embodiments, the storage 130 may be implemented on a cloud platform. Merely by way of example, the cloud platform may include a private cloud, a public cloud, a hybrid cloud, a community cloud, a distributed cloud, an internal cloud, a multi-layer cloud, or the like, or any combination thereof. In some embodiments, the storage 130 may be connected to the network 150 to communicate with one or more other components (e.g., the processing device 120, the terminal 140, etc.) of the system 100 for configuring the bone conduction hearing aid. One or more components of the system 100 for configuring the bone conduction hearing aid may access the data or instructions stored in the storage 130 via the network 150. In some embodiments, the memory 130 may be directly connected to or communicated with one or more other components in the bone conduction hearing aid device configuration system 100 (e.g., the processing device 120, the terminal 140, etc.). In some embodiments, the storage 130 may be a part of the processing device 120.

The terminals 140 may include a mobile device 141, a tablet 142, a laptop 143, a smart watch 144, or the like, or any combination thereof. In some embodiments, the mobile device 141 may include a smart home device (e.g., a control device for a smart appliance, a smart monitoring device, a smart TV, and a smart camera), a wearable device (e.g., glasses, a helmet, an accessory, clothes, etc.), a mobile device (e.g., a mobile phone, a laptop, etc.), a virtual reality (VR) device (e.g., a VR headset, VR glasses, VR goggles), or the like, or any combination thereof. In some embodiments, the bone conduction hearing aid 110 may be integrated into the terminals 140, e.g., glasses, an accessory, or the like.

In some embodiments, a user (e.g., the wearer of the bone conduction hearing aid 110, a system operator, a doctor, etc.) may interact with the system 100 for configuring the bone conduction hearing aid via the terminals 140. For example, the user may send a configuration request through a user interaction interface on the terminal 140; and the processing device 120 may obtain the hearing loss data of the wearer after receiving the configuration request. For example, the processing device 120 may send a hearing loss data obtaining request to the terminal 140 through the user interaction interface, and the user may upload the hearing loss data of the wearer through the user interaction interface after receiving the obtaining request. The processing device 120 may configure the bone conduction hearing aid 110 based on the hearing loss data.

The network 150 may include any suitable network that may facilitate the exchange of the information or data for the system 100 for configuring the bone conduction hearing aid. In some embodiments, one or more components (e.g., the bone conduction hearing aid 110, the terminals 140, the processing device 120, the storage 130, etc.) of the system 100 for configuring the bone conduction hearing aid may exchange information or data with one or more other components of the system 100 for configuring the bone conduction hearing aid. For example, the processing device 120 may obtain the hearing loss data (e.g., hearing level) of the wearer from the bone conduction hearing aid 110 via the network 150. As another example, the processing device 120 may obtain user instructions from the terminals 140 via the network 150. The network 150 may be and/or include a public network (e.g., the Internet), a private network (e.g., a local area network (LAN), a wide area network (WAN), etc.), a wired network (e.g., an Ethernet network), a wireless network (e.g., an 802.11 networks, Wi-Fi networks, etc.), a cellular network (e.g., a Long Term Evolution (LTE) network), a frame relay network, a virtual private network ("VPN"), a satellite network, a telephone network, a router, a hub, a switch, a server computer, or any combination thereof. In some embodiments, the network 150 may include one or more network access points. For example, the network 150 may include wired or wireless network access points, such as a base station or an Internet exchange point, through which one or more components of the system 100 for configuring the bone conduction hearing aid may be connected to the network 150 to exchange the data or the information.

The present disclosure is intended to be illustrative, but not to limit the scope of the present disclosure. Many alternatives, modifications and variations will be apparent to those having ordinary skills in the art. The features, structures, methods, and other characteristics of the exemplary embodiments described herein may be combined in various ways to obtain additional or alternative exemplary embodiments. For example, the storage 130 may be a data storage device including a cloud computing platform, such as a public cloud, a private cloud, a community cloud, and a hybrid cloud. However, these variations and modifications do not depart from the scope of the present disclosure.

Figure 2:
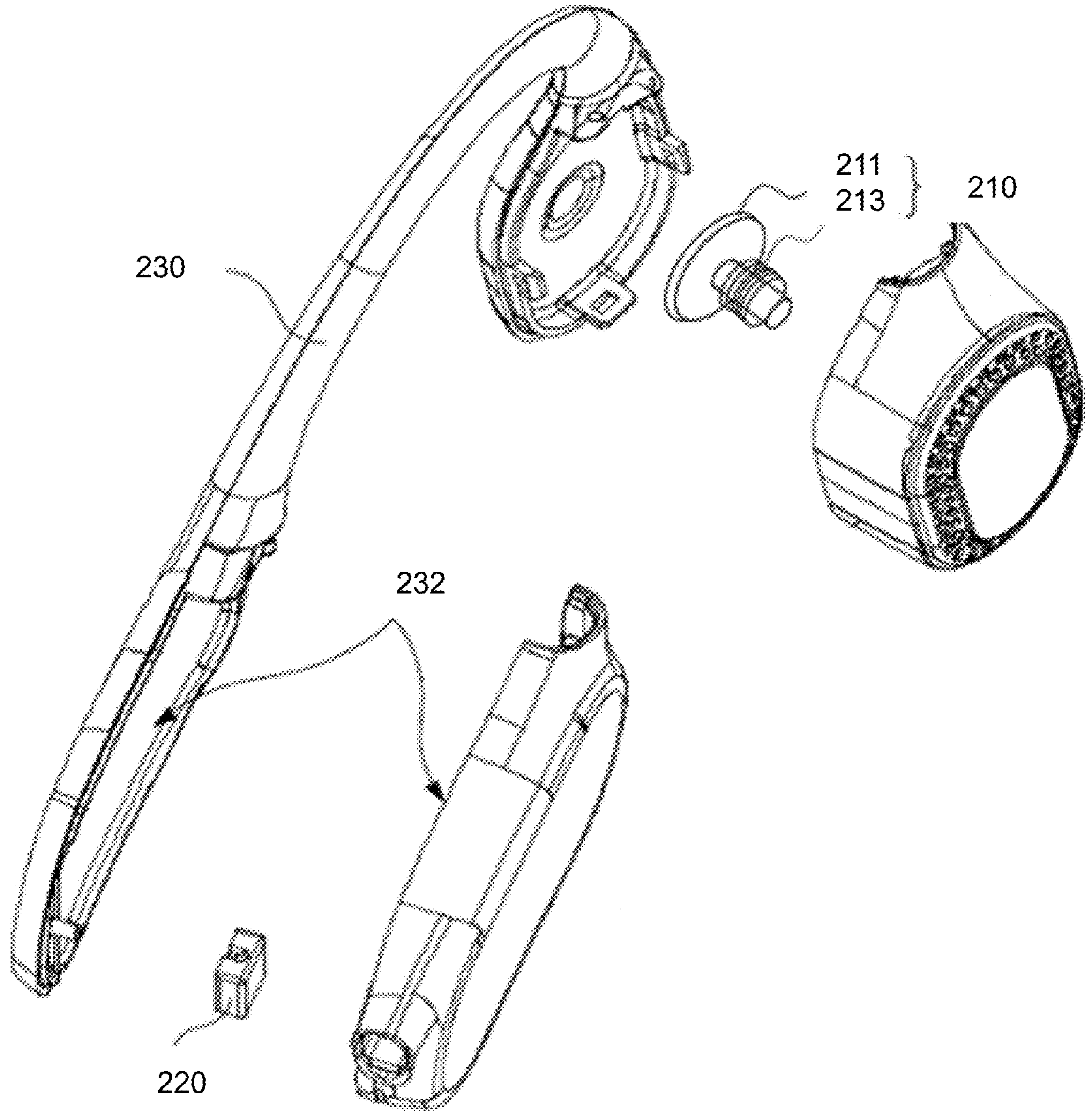
FIG. 2 is a schematic structural diagram illustrating a bone conduction hearing aid according to some embodiments of the present disclosure.

FIG. 2 is a schematic structural diagram illustrating a bone conduction hearing aid according to some embodiments of the present disclosure. As shown in FIG. 2, the bone conduction hearing aid 200 may include a loudspeaker component 210, a sound pickup component 220, and a support component 230.

The loudspeaker component 210 may convert a signal carrying sound information into a vibration signal. In some embodiments, the sound information may include video and audio files in a specific data format, or data or files that can be converted into sound through a specific way. The signal carrying the sound information may include one or a combination of an electrical signal, an optical signal, a magnetic signal, a mechanical signal, or the like. The signal carrying the sound information may come from one signal source or a plurality of signal sources. The plurality of signal sources may be correlated or uncorrelated. In some embodiments, the bone conduction hearing aid 200 may obtain the signal carrying the sound information in different ways, and the signal may be obtained in a wired or wireless manner, a real-time or delayed manner. For example, the bone conduction hearing aid 200 may receive an electrical signal carrying sound information in a wired or wireless manner. As another example, the bone conduction hearing aid 10 may include a component (e.g., the sound pickup component 220) with a sound collection function, which may pick up ambient sound, convert a mechanical vibration of the sound into an electrical signal, and obtain an electrical signal that meets specific requirements after the electrical signal is processed by an amplifier.

It may be an energy conversion process that the loudspeaker component 210 converts the signal carrying the sound information into a vibration signal. The process of conversion may include coexistence and conversion of different types of energy. The loudspeaker component 210 may include one or more transducing devices. For example, sound may be generated by directly converting the electrical signal into the mechanical vibration through the transducing device. As another example, the sound information may be included in an optical signal, and the transducing device may implement the process of converting the optical signal into the vibration signal. Other types of energy that can coexist and be converted during the working process of the transducing device may include thermal energy, magnetic field energy, or the like. In some embodiments, the loudspeaker assembly 210 may implement the conversion from the sound information signal to the vibration signal through the cooperation of a magnetic circuit component 211 and a vibration component 213 (the magnetic circuit component 211 and the vibration component 213 may be referred to as transducing devices). The magnetic circuit component 211 may be configured to provide a magnetic field, and the vibration component 213 may be configured to mechanically vibrate under the Ampere force in the magnetic field. For example, the magnetic circuit component 211 may include a magnet. The vibration component 213 may include a magnetic vibrator and a vibrating plate. The magnetic vibrator (e.g., voice coil) may move back and forth in the magnetic field under the action of Ampere force, and drive the vibrating plate to vibrate during the movement. In the above process, the sound information may correspond to the vibration of the magnetic vibrator, and a vibration frequency and an amplitude of the magnetic vibrator may be determined according to a frequency and an intensity of the sound information. In some embodiments, one of the magnetic circuit component and the magnetic vibrator may be an electromagnet, and an intensity of the magnetic field may be controlled by controlling a count of coils or a current intensity in the electromagnet, thereby controlling the vibration amplitude of the magnetic vibrator. The vibration frequency of the magnetic vibrator may be controlled by controlling a current direction change frequency of the coil in the electromagnet. In this process, the sound information may also be gained. For example, a loudness of the sound information may be gained by increasing the vibration amplitude of the magnetic vibrator.

An energy conversion method of the vibration component may specifically include a moving coil type, an electrostatic type, a piezoelectric type, a moving iron type, a pneumatic type, an electromagnetic type, etc. A frequency response range and a sound quality of the bone conduction hearing aid 200 may be affected by the vibration component. For example, in a moving coil transducing device, the vibration component may include a wound cylindrical voice coil and a vibrating body (e.g., a vibrating plate or a vibrating membrane). The cylindrical voice coil driven by the signal current may drive the vibrating body to vibrate and produce sound in the magnetic field. The stretching and shrinking of a vibrating body material, the deformation, size, shape and fixing method of folds, a magnetic density of the magnetic field, etc., may all have a great impact on the sound quality of the bone conduction hearing aid. The vibrating body of the vibration component may be a mirror-symmetrical structure, a centrally-symmetrical structure, or an asymmetrical structure. The vibrating body may be provided with intermittent pore structures, thereby making the vibrating body generate a greater displacement and making the bone conduction hearing aid 200 achieve higher sensitivity, and increasing the output power of vibration and sound; the vibrating body may be a torus structure, and two or more struts converging toward the center may be disposed in the torus.

The sound pickup component 220 may be mainly configured to pick up the user's voice, ambient sound of a user's environment, or the like. For the hearing-impaired, a sound pickup effect of the sound pickup component 220 may affect the clarity, stability, etc. of the sound received by the hearing-impaired through the bone conduction hearing aid. In some embodiments, the sound pickup component 220 may include a microphone. In some embodiments, the sound pickup component 220 may convert an external sound signal into an electrical signal. In some embodiments, the sound pickup component 220 may include a diaphragm, a coil, and a magnet. The diaphragm may be connected to the coil, and the coil may be placed in a magnetic field generated by the magnet. External sound waves (i.e., a sound signal or a vibration signal) may cause the diaphragm to vibrate. The diaphragm may drive the coil to move together. The movement of the coil in the magnetic field generated by the magnet may generate current, so that the sound signal can be converted into the electrical signal, thereby completing the pickup of the external sound.

The support component 230 may support other components (e.g., the magnetic circuit component, the vibration component or a storage component, a power supply component, a communication component (not shown in the figure), and the sound pickup component 220) of the bone conduction hearing aid 200. The support component 230 may include one or more housings, and one or more connectors. The one or more housings may form one or more accommodating cavities 232 for storing the storage component, a controller, the sound pickup component 220, the communication component, a battery component, or the like. The one or more connectors may connect the one or more housings with other components (e.g., the magnetic circuit component, the vibration component or the storage component, the power supply component, the communication component (not shown in the figure), and the sound pickup component 220) of the bone conduction hearing aid 200.

Wired connections involved in the bone conduction hearing aid 200 may include a metal cable, an optical cable, or a hybrid cable of metal and optics, e.g., a coaxial cable, a communication cable, a flexible cable, a spiral cable, a non-metallic sheathed cable, a metal sheathed cable, a multi-core cable, a twisted-pair cable, a ribbon cable, a shielded cable, a telecommunication cable, a twin-pair cable, a parallel twin-core conductor, a twisted-pair wire, or the like, or a combination thereof. The examples described above are only used for convenience of description, and the media of the wired connections may also be other types, e.g., other transmission carriers of electrical signals or optical signals.

Wireless connections involved in the bone conduction hearing aid 200 may include radio communication, free space optical communication, acoustic communication, electromagnetic induction, etc. The radio communication may include IEEE802.11 series standards, IEEE802.15 series standards (e.g., Bluetooth technology and Zigbee technology, etc.), a first-generation mobile communication technology (1G), a second-generation mobile communication technology (2G) (e.g., FDMA, TDMA, SDMA, CDMA, SSMA, etc.), a general packet radio service technology, a third-generation mobile communication technology (3G) (e.g. CDMA2000, WCDMA, TD-SCDMA, WIMAX, etc.), a fourth-generation mobile communication technology (4G) (e.g., TD-LTE, FDD-LTE, etc.), satellite communication (e.g., GPS technology, etc.), near field communication (NFC), and other technologies operating in the ISM frequency band (e.g., 2.4 GHz, etc.). The free space optical communication may include visible light, infrared signals, etc. The acoustic communication may include sound waves, ultrasonic signals, etc. The electromagnetic induction may include near field communication technology, etc. The examples described above are only used for convenience of illustration, and the media of wireless connections may also be of other types, e.g., Z-wave technology, other charged civilian radio frequency bands and military radio frequency bands, etc. For example, as some application scenarios of the present technology, the bone conduction hearing aid 200 may obtain the signal carrying the sound information from other devices through a Bluetooth technology.

The above description of the structure of the bone conduction hearing aid 200 is only a specific example, and should not be regarded as the only feasible implementation. Obviously, for those skilled in the prior art, after understanding the basic principle of the bone conduction hearing aid 200, various modifications and changes in forms and details may be made to the specific implementations and steps for implementing the bone conduction hearing aid 200 without departing from this principle, but these modifications and changes are still within the scope of the above description. For example, the bone conduction hearing aid 200 may include one or more processors that may execute one or more sound signal processing algorithms. The one or more sound signal processing algorithms may modify or enhance the sound signal. For example, noise reduction, acoustic feedback suppression, wide dynamic range compression, automatic gain control, active environment recognition, active noise prevention, directional processing, tinnitus processing, multi-channel wide dynamic range compression, active howling suppression, volume control, or the like, or any combination thereof, may be performed on the sound signal. These amendments and changes are still within the protection scope of the claims of the present disclosure. As another example, the bone conduction hearing aid may include one or more sensors, such as a temperature sensor, a humidity sensor, a speed sensor, a displacement sensor, or the like. The one or more sensors may collect user information or environmental information. As another example, the storage component may not be necessary and may be removed from the bone conduction hearing aid.

In some embodiments, the system for configuring the bone conduction hearing aid may configure the bone conduction hearing aid mainly based on the hearing loss data of the wearer according to a preset formula or a preset algorithm of the system for configuring the bone conduction hearing aid. For example, in the system for configuring the bone conduction hearing aid, after the hearing loss data of the wearer is input into the system for configuring the bone conduction hearing aid, the system for configuring the bone conduction hearing aid may automatically output relevant parameter values of the bone conduction hearing aid based on the preset algorithm. Directly configuring the bone conduction hearing aid only through the preset algorithm may cause the configured bone conduction hearing aid 200 to generate severe vibration in a certain scenario (e.g., when the wearer speaks or the ambient sound is too loud), causing discomfort to the wearer.

Figure 3:
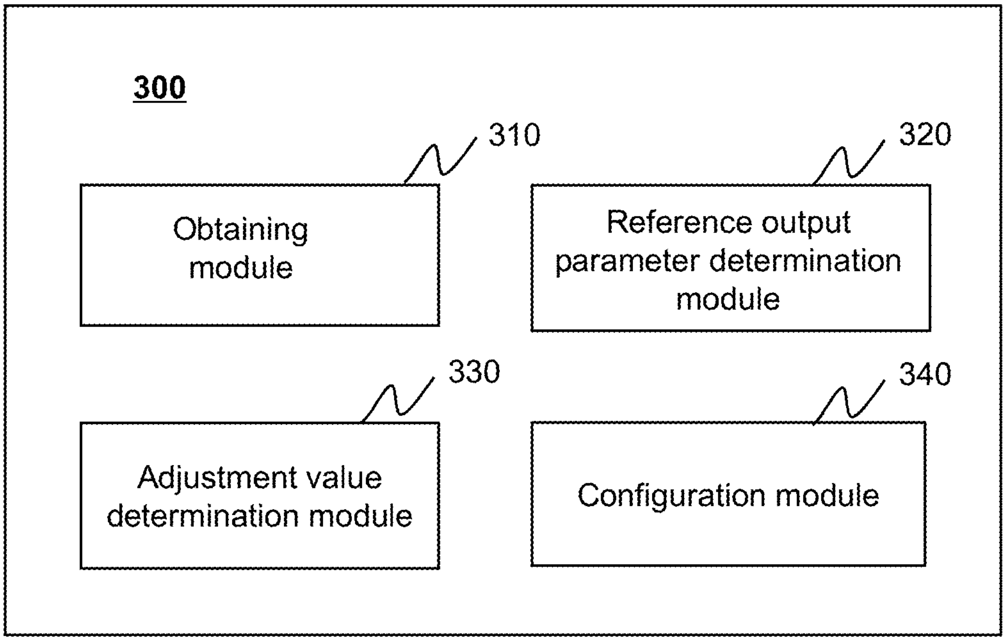
FIG. 3 is a block diagram illustrating a system for configuring a bone conduction hearing aid according to some embodiments of the present disclosure.

The present disclosure provides a system for configuring a bone conduction hearing aid. FIG. 3 is a block diagram illustrating a system for configuring a bone conduction hearing aid according to some embodiments of the present disclosure. As shown in FIG. 3, the system 300 for configuring the bone conduction hearing aid may comprise an obtaining module 310, a reference output parameter determination module 320, an adjustment value determination module 330, and a configuration module 340. The modules may be connected in a wired manner, a wireless manner, or a combination thereof. Either module may be local, remote, or a combination thereof. The modules may be one-to-one corresponding or one-to-many corresponding.

In some embodiments, the obtaining module 310 may be configured to obtain the hearing loss data of a wearer.

In some embodiments, the reference output parameter determination module 320 may be configured to determine a reference output parameter of the bone conduction hearing aid at each sound level in each frequency band based on the hearing loss data.

In some embodiments, the adjustment value determination module 330 may be configured to obtain an adjustment value of the reference output parameter at the each sound level in the each frequency band. In some embodiments, the adjustment values may be the same at different sound levels in a same frequency band. In some embodiments, in a frequency band within a range from 0 Hz to 625 Hz, the adjustment value may be within a range of 1 dB-12 dB. In some embodiments, in a frequency band within a range from 0 Hz to 125 Hz, the adjustment value may be within a range of 5 dB-12 dB; in a frequency band within a range from 125 Hz to 375 Hz, the adjustment value may be within a range of 3 dB-9 dB; or in a frequency band within a range from 375 Hz to 625 Hz, the adjustment value may be within a range of 1 dB-6 dB. In some embodiments, in a frequency band within a range from 0 Hz to 125 Hz, the adjustment value may be within a range of 5 dB-7 dB; in a frequency band within a range from 125 Hz to 375 Hz, the adjustment value may be within a range of 3 dB-5 dB; or in the frequency band within a range from 375 Hz to 625 Hz, the adjustment value may be within a range of 1 dB-3 dB. In some embodiments, in a frequency band within a range from 0 Hz to 125 Hz, the adjustment value may be within a range of 10 dB-12 dB; in a frequency band within a range from 125 Hz to 375 Hz, the adjustment value may be within a range of 7 dB-9 dB; or in a frequency band within a range from 375 Hz to 625 Hz, the adjustment value may be within a range of 4 dB-6 dB. In some embodiments, the adjustment values may be different at different sound levels in a same frequency band. In some embodiments, the adjustment value determination module 330 may be configured to: determine a first threshold corresponding to the each sound level in the each frequency band, wherein the first threshold may be related to a vibration degree that the wearer senses at the each sound level in the each frequency band; determine a second threshold corresponding to the each sound level in the each frequency band, wherein the second threshold may be related to a speech recognition rate of the wearer at the each sound level in the each frequency band; and determine the adjustment value based on the reference output parameter, the first threshold, and the second threshold. In some embodiments, the adjustment value determination module 330 may be configured to: for a reference output parameter at a certain sound level of the each sound level in a certain frequency band of the each frequency band, obtain a comparison value by subtracting the first threshold from the reference output parameter; obtain a first comparison result by comparing the comparison value with the second threshold; and determine the adjustment value corresponding to the reference output parameter based on the first comparison result. In some embodiments, the adjustment value determination module 330 may be configured to: designate the adjustment value as 0 dB when the comparison value is less than or equal to 0; designate the adjustment value as the comparison value when the comparison value is greater than 0 and less than or equal to the second threshold; and designate the adjustment value as the second threshold value when the comparison value is greater than the second threshold.

In some embodiments, in a frequency band within a range from 0 Hz to 125 Hz, the first threshold may be within a range of 48 dB-52 dB. In some embodiments, in a frequency band within a range from 125 Hz to 375 Hz, the first threshold may be within a range of 49 dB-54 dB. In some embodiments, in a frequency band within a range from 375 Hz to 625 Hz, the first threshold may be within a range of 50 dB-55 dB. In some embodiments, in a frequency band within a range from 0 Hz to 125 Hz, the second threshold may be within a range of 5 dB-10 dB. In some embodiments, in a frequency band within a range from 125 Hz to 375 Hz, the second threshold may be within a range of 3 dB-7 dB. In some embodiments, in a frequency band within a range from 375 Hz to 625 Hz, the second threshold may be within a range of 1 dB-4 dB.

In some embodiments, when the bone conduction hearing aid is configured to use a multi-channel wide dynamic range compression system, the adjustment value determination module 330 may be configured to determine a second comparison result by comparing the reference output parameter with the first threshold. The first threshold may be related to a vibration degree that the wearer senses at the each sound level in the each frequency band. The adjustment value determination module 330 may be configured to determine the adjustment value corresponding to the reference output parameter based on the second comparison result. In some embodiments, the adjustment value may include a gain reduction value when at least one sound level of the each sound level is greater than a sound level threshold. The adjustment value determination module 330 may be configured to designate the gain reduction value as 0 dB when the reference output parameter is less than or equal to the first threshold, and designate the gain reduction value as a difference between the first threshold and the reference output parameter when the reference output parameter is greater than the first threshold. In some embodiments, the adjustment value may include a reduction value of an output limit of the multi-channel wide dynamic range compression system. The adjustment value determination module 330 may be configured to designate the reduction value of the output limit as 0 dB when the reference output parameter is less than or equal to the first threshold, and designate the reduction value of the output limit as a value greater than 0 dB when the reference output parameter is greater than the first threshold.

In some embodiments, the configuration module 340 may be configured to configure the bone conduction hearing aid based on the reference output parameter and the adjustment value at the each sound level in the each frequency band. In some embodiments, the configuration module 340 may be further configured to reduce the reference output parameter based on the adjustment value in a frequency band within a range from 0 Hz to 625 Hz. In some embodiments, the configuration module 340 may be configured to configure the bone conduction hearing aid using the multi-channel wide dynamic range compression system based on the reference output parameter and the adjustment value at the each sound level in the each frequency band.

It should be noted that the above description of the processing module is only a specific example, and should not be regarded as the only feasible implementation. Each module or unit is not necessary, each module or unit may be implemented by one or more components, and the function of each module or unit is not limited thereto. Each module or unit can be selected to be added or deleted according to specific implementation scenarios or needs. Obviously, for those skilled in the prior art, after understanding the basic principle of the capacity scheduling process, various modifications in forms and details may be made to the specific implementation methods and steps of the processing module without departing from this principle, some simple deductions or replacements may also be made, and certain adjustments, combinations or splits may be made to the order of each module or unit without any creative effort, but these modifications and changes are still within the scope of the present disclosure.

Figure 4:
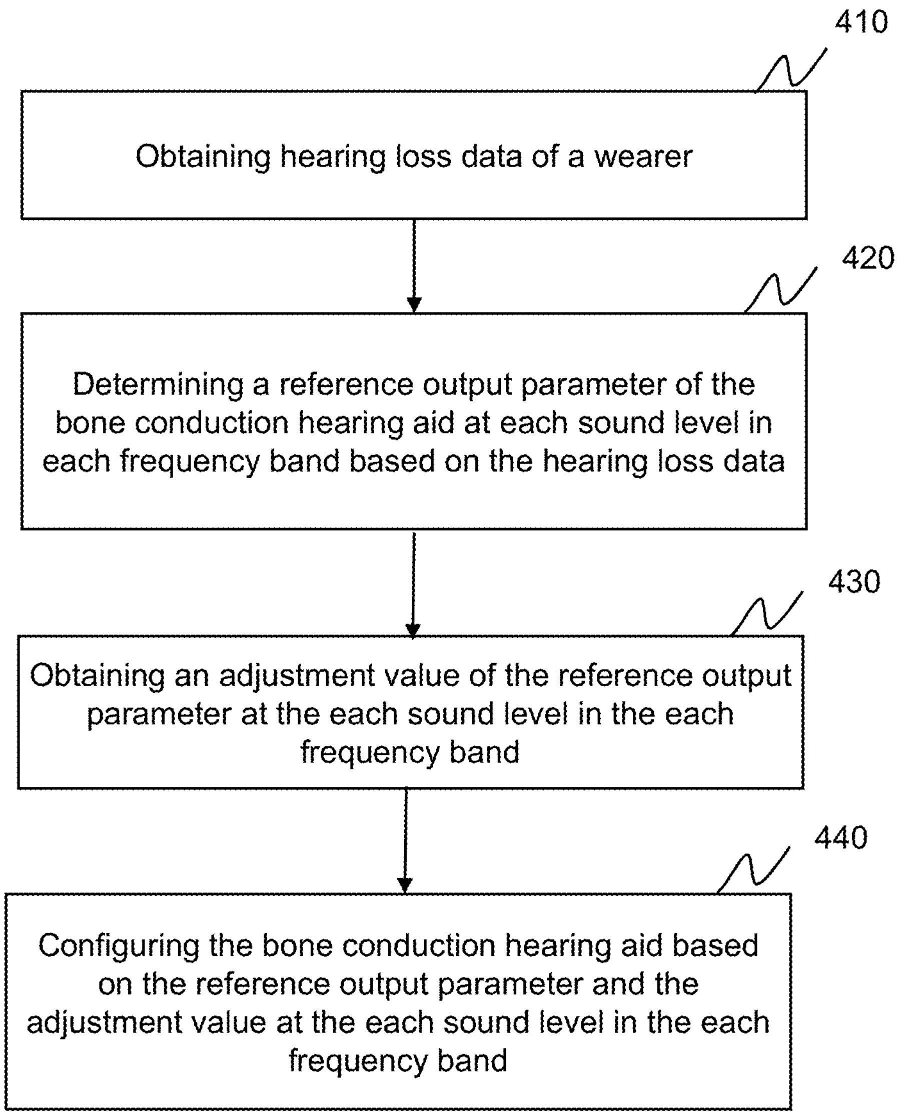
FIG. 4 is a flowchart illustrating an exemplary process for configuring a bone conduction hearing aid according to some embodiments of the present disclosure.

FIG. 4 is a flowchart illustrating an exemplary process for configuring a bone conduction hearing aid according to some embodiments of the present disclosure. As shown in FIG. 4, the process 400 for configuring the bone conduction hearing aid may include the following operations.

In 410, hearing loss data of a wearer may be obtained. Specifically, 410 may be performed by the obtaining module 310.

In some embodiments, the hearing loss data of the wearer be understood as data related to the hearing loss of the wearer. The hearing loss data may include a hearing level (also referred to as a hearing threshold or a hearing loss level) of the wearer at each sound level in each frequency band. In the present disclosure, the unit used for the hearing level may be dBHL. The higher the value of the hearing level, the more severe the hearing loss of the wearer. In some embodiments, the hearing loss data may include data related to historical hearing aids of the wearer. For example, the data related to the historical hearing aids of the wearer may include configuration data of bone conduction hearing aids historically used by the wearer.

In some embodiments, the hearing level may be within a range of 0 dBHL-80 dBHL. For example, the hearing level within a range of 0 dBHL-25 dBHL may represent normal hearing; the hearing level within a range of 26 dBHL-40 dBHL may represent mild hearing loss; the hearing level within a range of 41 dBHL-60 dBHL may represent moderate hearing loss, manifested as difficulty hearing normal sound; the hearing level within a range of 61 dBHL-80 dBHL may represent a severe hearing loss, manifested as difficulty hearing loud sound; and the hearing level within a range of being greater than 80 dBHL may represent extremely severe hearing loss, manifested as difficulty in hearing noise.

In some embodiments, the hearing levels of the wearer of the bone conduction hearing aid may be the same at a same sound level (Specific descriptions regarding the sound level may be found in the related content of 420) in different frequency bands. For example, at a sound level of 20 dBC, the hearing level of the wearer in different frequency bands may be equal to a certain value within a range of 41 dBHL-60 dBHL; at a sound level of 40 dBC, the hearing level of the wearer in different frequency bands may be equal to a certain value within a range of 26 dBHL-40 dBHL; and at a sound level of 60 dBC, the hearing level of the wearer in different frequency bands may be equal to a certain value within a range of 0 dBHL-25 dBHL.

In some embodiments, the hearing level of the wearer of the bone conduction hearing aid may be different at the same sound level in different frequency bands. For example, at a sound level of 20 dBC, the hearing level of the wearer in a high frequency band (e.g., 8000 Hz-12000 Hz) may be equal to a certain value within a range of 41 dBHL-60 dBHL; and the hearing level of the wearer in a low frequency band may all be equal to a certain value within a range of 26 dBHL-40 dBHL.

In some embodiments, the hearing level of the wearer of the bone conduction hearing aid at different sound levels in a same frequency band may be the same. For example, in a frequency band within a range of 250 Hz-500 Hz, the hearing level of the wearer at different sound levels may be equal to a certain value within a range of 0 dBHL-25 dBHL; in a frequency band within a range of 500 Hz-1000 Hz, the hearing level of the wearer in different frequency bands may be equal to a certain value within a range of 26 dBHL-40 dBHL; and in a frequency band within a range of 1000 Hz-2000 Hz, the hearing level of the wearer in different frequency bands may be equal to a certain value within a range of 41 dBHL-60 dBHL.

In some embodiments, the hearing level of the wearer of the bone conduction hearing aid may be different at different sound levels in a same frequency band. For example, in a frequency band within a range of 250 Hz-500 Hz, the hearing level of the wearer at a sound level of 20 dBC may be equal to a certain value within a range of 41 dBHL-60 dBHL; at a sound level of 40 dBC, the hearing level may be equal to a certain value within a range of 26 dBHL-40 dBHL; and at a sound level of 60 dBC, the hearing level may be equal to a certain value within a range of 0 dBHL-25 dBHL.

In some embodiments, the hearing loss data of the wearer may be obtained by performing a real-time hearing test on the wearer. For example, a hearing aid fitter may obtain the hearing loss data of the wearer by performing a hearing test (e.g., playing sound signals at each sound level in each frequency band) on the wearer using hearing test equipment. The hearing loss data collected by the hearing test equipment may be directly uploaded to a processing device (e.g., the processing device 120) or the storage device through a network (e.g., the network 150), and the processing device may obtain the hearing loss data from the storage device. In other embodiments, the wearer may upload the hearing loss data of the wearer through a terminal (e.g., the terminal 140), and the system for configuring the bone conduction hearing aid (e.g., the system 100 for configuring the bone conduction hearing aid), or a device (e.g., the processing device 120) may receive the hearing loss data uploaded by the wearer in a wired or wireless manner. In some embodiments, the system for configuring the bone conduction hearing aid or the device may retrieve the hearing loss data of the wearer from a relevant storage (e.g., the storage 130).

In 420, a reference output parameter of the bone conduction hearing aid at each sound level in each frequency band may be determined based on the hearing loss data. Specifically, 420 may be performed by the reference output parameter determination module 320.

In some embodiments, the reference output parameter may be a reference analog output value (i.e., an intensity value of a signal output by the bone conduction hearing aid, in dB) of the bone conduction hearing aid at the each sound level in the each frequency band. In some embodiments, the reference output parameter may be a reference gain value (i.e., the intensity value of the sound signal amplified by the bone conduction hearing aid, in dB) of the bone conduction hearing aid at the each sound level in the each frequency band. It should be noted that when the sound signal input by the bone conduction hearing aid meets a specific sound level in a specific frequency band under the reference output parameter (e.g., the reference gain value), the intensity value of the sound signal output by the bone conduction hearing aid may be equal to the reference analog output value for the specific sound level in the specific frequency band. In some embodiments, the reference output parameter may be related to a hearing loss level, a sound level, a frequency, or the like. In some embodiments, the reference analog output value of the bone conduction hearing aid may be further related to the reference gain value of the bone conduction hearing aid. For example, the analog output value may be determined by amplifying the signal intensity corresponding to the sound level based on the gain value. In some embodiments, for different wearers, the reference output parameters may be different due to different hearing loss data (e.g., a degree of hearing loss at each sound level). In some embodiments, the sound level and the frequency of the sound signal may affect the reference output parameter of the bone conduction hearing aid, and different sound levels or different frequency bands may correspond to different reference output parameters. That is to say, different frequency bands may correspond to different reference output parameters under a same hearing loss level and a same sound level; different sound levels may correspond to different reference output parameters under a same hearing loss level in a same frequency band; and different hearing loss levels may correspond to different reference output parameters under a same sound level in a same frequency band.

The sound level referred to in the present disclosure represents the intensity of the sound signal in decibels. In the present disclosure, the sound level is mainly measured by C frequency weighting measurement, i.e., the unit of the sound level in the present disclosure is dBC. The frequency band refers to a frequency range of the sound signal in the present disclosure. In some embodiments, different frequency bands may be formed by dividing a frequency of the sound signal into a plurality of continuous ranges.

In some embodiments, the determining the reference output parameter of the bone conduction hearing aid at the each sound level in the each frequency band refers to determining an output parameter of the bone conduction hearing aid at a preset sound level or a preset frequency and the hearing loss level of the wearer of the bone conduction hearing aid corresponding to the preset sound level and the preset frequency. In some embodiments, the determining the reference output parameter of the bone conduction hearing aid at the each sound level in the each frequency band refers to determining an output parameter of the bone conduction hearing aid in a preset sound level range or a preset frequency band and the hearing loss level of the wearer of the bone conduction hearing aid corresponding to the preset sound level range and the preset frequency band. Based on the determined reference output parameters, the bone conduction hearing aid may amplify a sound signal (i.e., the sound input signal) input to the bone conduction hearing aid and convert the sound signal into a vibration signal, and transmit the vibration signal to the wearer of the bone conduction hearing aid to make the wearer hear the sound. In some embodiments, the preset sound level, the preset frequency, the preset sound level range, or the preset frequency band may be a default setting of the system (e.g., the system 100 for configuring the bone conduction hearing aid) or be set by a user. In some embodiments, the preset sound level may include 20 dBC, 30 dBC, 40 dBC, 50 dBC, 60 dBC, 70 dBC, 80 dBC, or the like, or any combination thereof. In some embodiments, the preset frequency may include 250 Hz, 500 Hz, 1000 Hz, 2000 Hz, 3000 Hz, 4000 Hz, 8000 Hz, 10000 Hz, or the like, or any combination thereof. In some embodiments, the preset sound level range may include 10 dBC-20 dBC (may not include 20 dBC), 20 dBC-30 dBC (may not include 30 dBC), 30 dBC-40 dBC (may not include 40 dBC), 40 dBC-50 dBC (may not include 50 dBC), 50 dBC-60 dBC (may not include 60 dBC), 60 dBC-70 dBC (may not include 70 dBC), 70 dBC-80 dBC (may not include 80 dBC), or the like, or any combination thereof. In some embodiments, the preset frequency band may include 20 Hz-250 Hz (may not include 250 Hz), 250 Hz-500 Hz (may not include 500 Hz), 500 Hz-1000 Hz (may not include 1000 Hz), 1000 Hz-2000 Hz (may not include 2000 Hz), 2000 Hz-3000 Hz (may not include 3000 Hz), 3000 Hz-4000 Hz (may not include 4000 Hz), 4000 Hz-6000 Hz (may not include 6000 Hz), 6000 Hz-10000 Hz (may not include 10000 Hz), or the like, or any combination thereof. In some embodiments, the preset frequency band may include 0 Hz-125 Hz (may not include 125 Hz), 125 Hz-375 Hz (may not include 375 Hz), 375 Hz-625 Hz (may not include 625 Hz), 625 Hz-875 Hz (may not include 875 Hz), 875 Hz-1375 Hz (may not include 1375 Hz), 1375 Hz-1875 Hz (may not include 1875 Hz), 1875 Hz-2625 Hz (may not include 2625 Hz), 2625 Hz-4875 Hz (may not include 4875 Hz), or the like, or any combination thereof. In some embodiments, the preset sound level, the preset frequency, the preset sound level range, or the preset frequency band may be adjusted by the system (e.g., the system 100 for configuring the bone conduction hearing aid) or the user. For example, the preset sound level, the preset frequency, the preset sound level range, or the preset frequency band may be adjusted according to the hearing level of the wearer of the bone conduction hearing aid. For example, if the hearing level of the wearer is 10 dBHL (representing that the wearer has a normal hearing at this sound level) when the sound level is 80 dBC, a maximum value of the preset sound level may not exceed 80 dBC.

In some embodiments, the reference output parameter may be a reference gain value of the bone conduction hearing aid. The processing device 120 may determine the reference gain value of the bone conduction hearing aid at the each sound level in the each frequency band based on the hearing level of the hearing loss data at the each sound level in the each frequency band and a value of the each sound level in the each frequency band. For example, the reference gain value of the bone conduction hearing aid at the sound level of 20 dBC in a frequency band within a range of 375 Hz-625 Hz may be determined based on the sound level of 20 dBC, the frequency band within the range of 375 Hz-625 Hz, and the hearing level of the wearer of the bone conduction hearing aid at the sound level of 20 dBC in the frequency band within the range of 375 Hz-625 Hz. In some embodiments, the reference output parameter may be a reference analog output signal intensity value (i.e., the reference analog output value) of the bone conduction hearing aid. The processing device 120 may determine the reference analog output signal intensity value (i.e., the reference analog output value) of the bone conduction hearing air at the each sound level in the each frequency band based on the hearing level of the hearing loss data at the each sound level in the each frequency band and the value of the each sound level in the each frequency band. For example, the reference analog output signal intensity value (i.e., the reference analog output value) of the bond conduction hearing aid at a sound level of 30 dBC in a frequency band within a range of 125 Hz-375 Hz may be determined based on the sound level of 30 dBC, the frequency band within the range of 125 Hz-375 Hz, and the hearing level of the wearer of the bone conduction hearing aid at the sound level of 30 dBC in the frequency band within the range of 125 Hz-375 Hz.

In some embodiments, the processing device 120 (the reference output parameter determination module 320) may first determine the reference gain value of the bone conduction hearing aid at the each sound level in the each frequency band based on the hearing loss data, and then determine the reference analog output signal intensity value (i.e., the reference analog output value) of the bone conduction hearing aid at the corresponding sound level in the corresponding frequency band based on the gain value at the each sound level in the each frequency band.

In some embodiments, the processing device 120 (the reference output parameter determination module 320) may determine the reference output parameter through a preset formula. For example, the reference gain value at the each sound level in the each frequency band may be determined through the preset formula based on the hearing loss data of the wearer. In some embodiments, the preset formula may be the "½ gain principle" proposed by Lybarger, i.e., to achieve comfortable hearing for sensorineural deafness, the required gain value should be half of a degree of hearing threshold enhancement. That is to say, the reference gain value of the bone conduction hearing aid may be approximately equivalent to half of the hearing loss of the wearer.

In some embodiments, the reference output parameter in 320 may be determined through empirical data in the following table (Table 1). For example, the reference gain value at the each hearing loss level (determined based on the hearing loss data) in the each frequency band may be determined using the empirical data in the table below, and then the reference analog output value for the corresponding hearing loss level in the corresponding frequency band may be further determined using the reference gain value. The following table takes the sound level of 60 dB SPL as an example to illustrate the reference gain value at the each hearing level in the each frequency band. As shown in Table 1, when the sound level is 60 dB SPL and the hearing level is 20 dBHL, the reference gain value in the each frequency band is 0; when the hearing level is 40 dBHL, the reference gain value in a frequency band within a range of 125-375 Hz is 5. In some embodiments, when the sound level and the hearing level are constant, as the frequency band increases, the reference gain value may first increase and then decrease. In some embodiments, when the frequency band is constant, the reference gain value may increase as the hearing level increases.

Table 1 takes the sound level of 60 dB SPL as an example to illustrate the reference gain value at the each hearing level in the each frequency band.

| Hearing level (dBHL) | Frequency (Hz) 125-375 | 375-625 | 625-1375 | 1375-2625 | 2625-5375 | 5375-8000 |
|---|---|---|---|---|---|---|
| 20 | 0 | 0 | 0 | 0 | 0 | 0 |
| 40 | 5 | 8 | 10 | 10 | 8 | 5 |
| 60 | 10 | 16 | 20 | 20 | 16 | 10 |
| 80 | 15 | 24 | 30 | 30 | 24 | 15 |
| 100 | 20 | 32 | 40 | 40 | 32 | 20 |

In some embodiments, the processing device 120 may determine the reference output parameter according to a configuration model. The configuration model may represent a relationship between the reference output parameter and the frequency band, the sound level, and the hearing level.

In 430, an adjustment value of the reference output parameter at the each sound level in the each frequency band may be obtained. The adjustment value may be at least related to the frequency band. Specifically, 430 may be performed by the reference output adjustment value determination module 330.

The adjustment value refers to a value used to adjust the reference output parameter. In some embodiments, the reference output parameter may be adjusted by the adjustment value, and the adjusted reference output parameter may be used as an actual analog output parameter of the bone conduction hearing aid. Illustration may be made by taking the reference output parameter as the reference analog output value and the reference gain value as an example. For example, the reference analog output value (the analog output signal intensity value) may be adjusted by the adjustment value, to use the adjusted reference analog output value as the actual analog output value (the actual analog output signal intensity value) of the bone conduction hearing aid. As another example, the reference gain value (the intensity value for amplifying the sound signal) of the bone conduction hearing aid may be adjusted by the adjustment value, to use the adjusted reference gain value as an actual gain value of the bone conduction hearing aid.

In some embodiments, the adjustment value may be used to lower the reference output parameter. For example, the adjustment value may be a value used to attenuate the reference analog output value, i.e., the adjustment value may be subtracted from the reference output parameter. As another example, the adjustment value may also be a value used to attenuate the reference gain value, i.e., the adjustment value may be subtracted from the reference gain value. As another example, the adjustment value may be a proportional value less than 1, i.e., the reference output parameter may be multiplied by the adjustment value.

The vibration of the bone conduction hearing aid may be relatively strong when a frequency of the sound signal input to the bone conduction hearing aid is low. For example, the bone conduction hearing aid may tend to vibrate in a frequency band within a range of 125 Hz~625 Hz. Therefore, the adjustment value (e.g., the reference output parameter may be reduced using the adjustment value in the frequency band) may be set in a frequency band of 0 Hz~625 Hz (or in a frequency band of 125 Hz~625 Hz), to improve the strong vibration of the bone conduction hearing aid in the frequency band.

Figure 8:
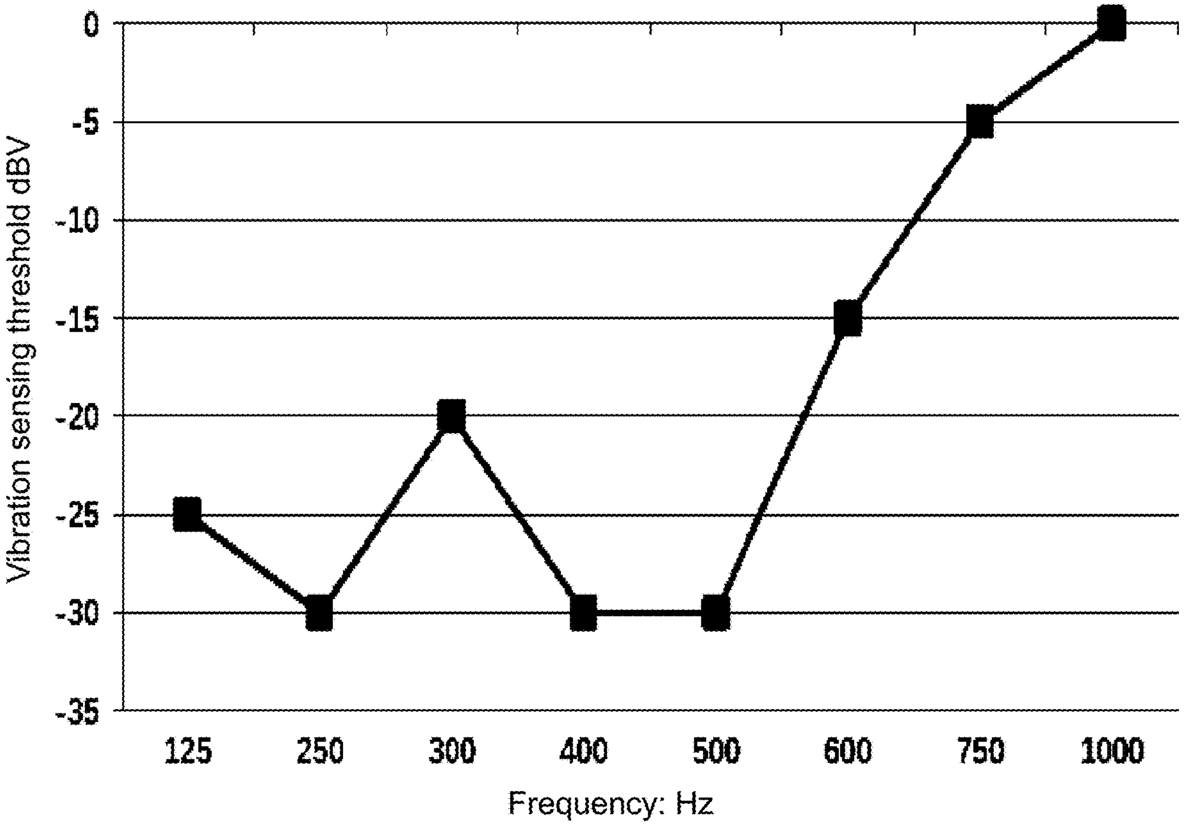
FIG. 8 is a diagram illustrating vibration sensing thresholds at different frequencies when a wearer wears a bone conduction hearing aid as measured by experiments.

FIG. 8 is a diagram illustrating vibration sensing thresholds at different frequencies when a wearer wears a bone conduction hearing aid as measured by experiments. In FIG. 8, the vibration sensing threshold (dBV) refers to a value obtained after numerical conversion of a driving voltage value (V) of the bone conduction hearing aid when the wearer may perceive vibration. If the driving voltage value of the bone conduction hearing aid is X (V), then X(V) is converted into a vibration sensing threshold of 20*log 10(X/1) (dBV). Merely by way of example, when the driving voltage value of the bone conduction hearing aid is 1 V, the vibration sensing threshold may be 0 dBV; when the driving voltage value of the bone conduction hearing aid is 0.5 V, the vibration sensing threshold may be −6 dBV. It can be seen from FIG. 8 that the vibration sensing threshold of the bone conduction hearing aid in the frequency band below 1000 Hz may be small, which means that bone conduction hearing aid may tend to vibrate in the frequency band below 1000 Hz, especially in a frequency band within a range of 125 Hz-600 Hz. The bone conduction hearing aid may be most likely to vibrate at 125 Hz, 250 Hz, 400 Hz, and 500 Hz. Therefore, based on the experimentally determined data, the adjustment value may be set in a frequency band within a range of 0 Hz-625 Hz (or a frequency band within a range of 125 Hz-625 Hz).

In some embodiments, a same frequency band or a same sound level may correspond to a same adjustment value under different hearing levels. For example, the adjustment value at a sound level of 20 dBC in a frequency band within a range of 0 Hz-625 Hz under a hearing level of 26 dBHL-40 dBHL and the adjustment value at the sound level of 20 dBC in the frequency band within the range of 0 Hz-625 Hz under a hearing level of 41 dBHL-60 dBHL may be the same. As another example, the adjustment value at the sound level of 20 dBC in a frequency band within a range of 0 Hz-125 Hz under the hearing level of 26 dBHL-40 dBHL and the adjustment value at the sound level of 20 dBC in the frequency band within the range of 0 Hz-125 Hz under the hearing level of 41 dBHL-60 dBHL may be the same. As another example, the adjustment value at the sound level of 20 dBC in a frequency band within a range of 125 Hz-375 Hz under the hearing level of 26 dBHL-40 dBHL and the adjustment at the sound level of 20 dBC in the frequency band within the range of 125 Hz-375 Hz under a hearing level of 41 dBHL-60 dBHL may be the same.

In some embodiments, a same frequency band or a same sound level may correspond to different adjustment values under different hearing levels. For example, the adjustment value at the sound level of 20 dBC in the frequency band within the range of 0 Hz-625 Hz under the hearing level of 26 dBHL-40 dBHL and the adjustment value at the sound level of 20 dBC in the frequency band within the range of 0 Hz-625 Hz under the hearing level of 41 dBHL-60 dBHL may be different. As another example, the adjustment value at the sound level of 20 dBC in a frequency band within a range of 20 Hz-125 Hz under the hearing level of 26 dBHL-40 dBHL and the adjustment value at the sound level of 20 dBC in the frequency band within the range of 20 Hz-125 Hz under the hearing level of 41 dBHL-60 dBHL may be different. As another example, the adjustment value at the sound level of 20 dBC in a frequency band within a range of 125 Hz-375 Hz under the hearing level of 26 dBHL-40 dBHL and the adjustment value at the sound level of 20 dBC in the frequency band within the range of 125 Hz-3755 Hz under the hearing level of 41 dBHL-60 dBHL may be different.

In some embodiments, a same frequency band or a same hearing level may correspond to a same adjustment value under different sound levels. For example, the adjustment value at a sound level of 20 dBC-40 dBC in a frequency band within a range of 0 Hz-125 Hz under the hearing level of 41 dBHL-60 dBHL and the adjustment value at a sound level of 40 dBC-60 dBC in the frequency band within the range of 0 Hz-125 Hz under the hearing level of 41 dBHL-60 dBHL may be the same. As another example, the adjustment value at the sound level of 20 dBC-40 dBC in a frequency band within a range of 125 Hz-375 Hz under the hearing level of 26 dBHL-40 dBHL and the adjustment value at the sound level of 20 dBC-40 dBC in the frequency band within the range of 125 Hz-375 Hz under the hearing level of 26 dBHL-40 dBHL may be the same.

In some embodiments, a same frequency band or a same hearing level may correspond to different adjustment values at different sound levels. For example, the adjustment value at a sound level of 26 dBC-40 dBC in the frequency band within the range of 0 Hz-125 Hz under the hearing level of 41 dBHL-60 dBHL and the adjustment value at a sound level of 40 dBC-60 dBC in the frequency band within the range of 0 Hz-125 Hz under the hearing level of 41 dBHL-60 dBHL may be different. As another example, the adjustment value at a sound level of 26 dBC-40 dBC in a frequency band within a range of 125 Hz-375 Hz under a hearing level of 26 dBHL-40 dBHL and the adjustment value at a sound level of 40 dBC-60 dBC in the frequency band within the range of 125 Hz-375 Hz under the hearing level of 26 dBHL-40 dBHL may be different.

In some embodiments, a same sound level or a same hearing level in different frequency bands may correspond to a same adjustment value. For example, the adjustment value at a sound level of 20 dBC-40 dBC in a frequency band (may not include 125 Hz) within a range of 0 Hz-125 Hz under a hearing level of 20 dBHL-40 dBHL and the adjustment value at the sound level of 20 dBC-40 dBC in a frequency band within a range of 125 Hz-375 Hz under the hearing level of 20 dBHL-40 dBHL may be the same. As another example, the adjustment value at a sound level of 40 dBC-60 dBC in a frequency band (may not include 125 Hz) within a range of 125 Hz-375 Hz under a hearing level of 40 dBHL-60 dBHL and the adjustment value at the sound level of 40 dBC-60 dBC in a frequency band within a range of 375 Hz-625 Hz under a hearing level of 26 dBHL-40 dBHL may be the same.

In some embodiments, a same sound level or a same hearing level in different frequency bands may correspond to different adjustment values. For example, the adjustment value at a sound level of 20 dBC-40 dBC in a frequency band (may not include 125 Hz) within a range of 0 Hz-125 Hz under a hearing level of 41 dBHL-60 dBHL and the adjustment value at a sound level of 20 dBC-40 dBC in a frequency band within a range of 125 Hz-375 Hz under a hearing level of 41 dBHL-60 dBHL may be different. As another example, the adjustment value at a sound level of 40 dBC-60 dBC in a frequency band (may not include 375 Hz) within a range of 125 Hz-375 Hz under a hearing level of 40 dBHL-60 dBHL and the adjustment value at the sound level of 40 dBC-60 dBC in a frequency band within a range of 375 Hz-625 Hz under a hearing level of 26 dBHL-40 dBHL may be different.

In some embodiments, the adjustment value may be at least related to the frequency band, and the adjustment value may be different in different frequency bands. In some embodiments, different frequency bands may correspond to different adjustment values, and frequencies in a same frequency band may correspond to a same adjustment value. In some embodiments, different frequencies may correspond to different adjustment values. In some embodiments, in a frequency band within a range from 0 Hz to 625 Hz, the adjustment value may be within a range of 1 dB-12 dB. By setting the adjustment value to the value within the frequency range, and then configuring the bone conduction hearing aid, the problem that the wearer may sense a strong vibration when the wearer wears the bone conduction hearing aid in some scenarios can be improved, and the impact on speech intelligibility can be small. In some embodiments, the adjustment value may decrease as the frequency increases. For example, the adjustment value corresponding to a frequency of 125 Hz may be 5 dB; the adjustment value corresponding to a frequency of 250 Hz may be 3 dB; and the adjustment value corresponding to a frequency of 500 Hz may be 1 dB. As another example, the adjustment value corresponding to a frequency of 125 Hz may be 10 dB; the adjustment value corresponding to a frequency of 250 Hz may be 7 dB; and the adjustment value corresponding to a frequency of 500 Hz may be 4 dB. In some embodiments, in a frequency band within a range from 625 Hz to 8000 Hz, the adjustment value may be within a range of 0 dB-4 dB. In some embodiments, in the frequency band within the range from 625 Hz to 8000 Hz, the adjustment value may be 0.

In some embodiments, in a frequency band within a range from 0 Hz to 125 Hz, the adjustment value may be within a range of 5 dB-12 dB. In some embodiments, in a frequency band within a range from 125 Hz to 375 Hz, the adjustment value may be within a range of 3 dB-9 dB. In some embodiments, in a frequency band within a range from 375 Hz to 625 Hz, the adjustment value may be within a range of 1 dB-6 dB. Further dividing the frequency band and setting the adjustment values in several frequency bands of the frequency band may make the vibration reduction effect of the bone conduction hearing aid better.

In some embodiments, in a frequency band within a range from 0 Hz to 125 Hz, the adjustment value may be within a range of 5 dB-7 dB. In a frequency band within a range from 125 Hz to 375 Hz, the adjustment value may be within a range of 3 dB-5 dB. In some embodiments, in a frequency band within a range from 375 Hz to 625 Hz, the adjustment value may be within a range of 1 dB-3 dB. By setting the adjustment value to the value within the frequency range, and then configuring the bone conduction hearing aid, the problem of vibration when the wearer with a hearing level of 30 dBL wears the bone conduction hearing aid in the corresponding frequency band can be solved with almost no effect on speech intelligibility, ensuring the hearing aid effect of the wearer.

In some embodiments, in a frequency band within a range from 0 Hz to 125 Hz, the adjustment value may be within a range of 10 dB-12 dB. In some embodiments, in a frequency band within a range from 125 Hz to 375 Hz, the adjustment value may be within a range of 7 dB-9 dB. In some embodiments, in a frequency band within a range from 375 Hz to 625 Hz, the adjustment value may be within a range of 4 dB-6 dB. By setting the adjustment value to the value within the frequency range, and then configuring the bone conduction hearing aid, the problem of vibration when the wearer with a hearing level of 40 dBL wears the bone conduction hearing aid in the corresponding frequency band can be solved with little effect on the speech intelligibility, ensuring the hearing aid effect of the wearer.

FIGS. 9-11 are diagrams illustrating experimental results of speech recognition rate tests on three wearers (wearer 1, wearer 2, and wearer 3). FIGS. 9-11 all take a reference output parameter as a reference analog output value for an example, and illustrate a speech recognition rate, vibration sensation, and volume of a wearer before the reference analog output value is reduced, and the speech recognition rate, the vibration sensation, and the volume of the wearer when the reference analog output value corresponds to different adjustment values in each frequency band. In FIGS. 9-11, 6 sets of tests were conducted for each tester. In the table, a negative number represents that the adjustment value reduces the reference output parameter (e.g., the reference analog output value). For example, −5 represents that the adjustment value is 5 dB, which reduces the reference analog output by 5 dB. As another example, −15 represents that the adjustment value is 15 dB, which reduces the reference analog output value by 15 dB.

As shown in FIGS. 9-11, when the reference analog output value is reduced based on the adjustment value, the speech recognition rate may decrease, the vibration sensation may decrease, but the volume may decrease. It can be seen from the table that at a frequency of 125 Hz, if the adjustment value is 5 dB (or less than 5 dB), i.e., the reference analog output value is reduced by 5 dB, the speech recognition rate does not change significantly; at a frequency of 250 Hz, if the adjustment value is 3 dB (or less than 3 dB), i.e., the reference analog output value is reduced by 3 dB, the speech recognition rate does not change significantly; and at a frequency of 500 Hz, if the adjustment value is 1 dB (or less than 1 dB), i.e., the reference analog output value is reduced by 1 dB, the speech recognition rate does not change significantly. Meanwhile, if the adjustment value is set according to the above values, the tester can feel the vibration when the tester speaks, but the volume is OK (i.e., the volume is within a volume range that the wearer can basically hear clearly).

At the frequency of 125 Hz, if the adjustment value is 10 dB (or greater than 5 dB and less than 10 dB range), i.e., the reference analog output value is reduced by 10 dB, a reduction in the speech recognition rate may be less than or equal to 5%; at the frequency of 250 Hz, if the adjustment value is 7 dB (or greater than 3 dB and less than 7 dB), i.e., the reference analog output value is reduced by 7 dB, the reduction in the speech recognition rate may be less than or equal to 5%; and at the frequency of 500 Hz, if the adjustment value is 4 dB (or greater than 1 dB and less than 4 dB range), i.e., the reference analog output value is reduced by 4 dB, the reduction in the speech recognition rate may be less than or equal to 5%. Meanwhile, if the adjustment value is set according to the above values, the tester may feel more comfortable, but feel that the sound is relatively low (i.e., the wearer may feel that the volume is relatively low).

At the frequency of 125 Hz, if the adjustment value is 17 dB (or greater than 10 dB and less than 17 dB range), i.e., the reference analog output value is reduced by 17 dB, the reduction in the speech recognition rate may be greater than 5% (e.g., 10%); At the frequency of 250 Hz, if the adjustment value is 15 dB (or greater than 7 dB and less than 15 dB), i.e., the reference analog output value is reduced by 15 dB, the reduction in the speech recognition rate may be greater than 5% (e.g., 10%); and at the frequency of 500 Hz, if the adjustment value is 10 dB (or greater than 4 dB and less than 10 dB), i.e., the reference analog output value is reduced by 10 dB, the reduction in the speech recognition rate may be greater than 5% (e.g., 10%). Meanwhile, if the adjustment value is set according to the above values, the tester may feel that the volume is relatively low (i.e., the wearer may not be able to hear clearly because the volume is relatively low).

Within a certain range (e.g., a range where the adjustment value is less than 17 dB), the greater the adjustment value, the better the effect of reducing the vibration of the bone conduction hearing aid. However, it can be known from FIGS. 9-11 that a greater adjustment value may result in a lower output signal intensity of the bone conduction hearing aid, which may greatly affect the speech recognition rate (e.g., the reduction in the speech recognition rate). When the adjustment value is within the above range in the embodiment, the problem of vibration when the wearer with a hearing level of 30 dBL-40 dBL wears the bone conduction hearing aid in the corresponding frequency band may be solved, and the effect on the speech intelligibility may be small.

In some embodiments, the adjustment value of the reference output parameter at the each sound level in the each frequency band may only be related to the frequency band. The corresponding adjustment values of the reference output parameters at different hearing levels in a same frequency band may be the same (e.g., the adjustment values in the above embodiments), and the corresponding adjustment values at a same hearing level in different frequency bands may be different; the corresponding adjustment values of the reference output parameters in the same frequency band at different sound levels may be the same, and the adjustment values of the reference output parameters in different frequency bands at a same sound level may be different; and the corresponding adjustment values of the reference output parameters in the same frequency band at different sound levels and different hearing levels may be the same, and the adjustment values in different frequency bands at the same sound level and the same hearing level may be different.

In some embodiments, the adjustment value of the reference output parameter at the each sound level in the each frequency band may be related to the frequency band and the hearing level of the wearer. The corresponding adjustment values of the reference output parameters in the same frequency band at different listening levels may be different. The corresponding adjustment values of the reference output parameters under the same hearing level in the same frequency band at different sound levels may be the same. Detailed descriptions regarding this embodiment may be found in FIG. 5 and related descriptions thereof.

In some embodiments, the adjustment value of the reference output parameter at the each sound level in the each frequency band may be related to the frequency band and the sound level. The corresponding adjustment values of the reference output parameters at different sound levels in the same frequency band may be different. However, the corresponding adjustment values of the reference output parameters at different hearing levels and the same sound level in the same frequency band may be the same. Detailed descriptions regarding this embodiment may be found in FIG. 6 and related descriptions thereof.

In 440, the bone conduction hearing aid may be configured based on the reference output parameter and the adjustment value at the each sound level in the each frequency band. Specifically, 440 may be performed by a configuration module 340.

In some embodiments, the processing device 120 (configuration module 340) may obtain an actual output parameter by adjusting the reference output parameter based on the adjustment value at the each sound level in the each frequency band, and configure the bone conduction hearing aid through the actual output parameter.

In some embodiments, the processing device 120 (configuration module 340) may obtain the actual output parameter by reducing the reference output parameter based on the adjustment value at the each sound level in the each frequency band, and configure the bone conduction hearing aid based on the reduced reference output parameter (i.e., the actual output parameter). The reducing the reference output parameter based on the adjustment value at the each sound level in the each frequency band may be directly subtracting the adjustment value from the reference output parameter, or adjusting other relevant setting parameters of the bone conduction hearing aid through the adjustment value at the each sound level in the each frequency band, to achieve the purpose of reducing the reference output parameter.

In some embodiments, the processing device 120 (configuration module 340) may configure the bone conduction hearing aid by configuring a magnetic circuit component based on the adjustment value and the reference output value at the each sound level in the each frequency band. In some embodiments, the configuring the bone conduction hearing aid may include setting various parameters of the bone conduction hearing aid, to make parameters (e.g., the gain value, and the analog output value) of the bone conduction hearing aid related to the signal output intensity preset values, e.g., a reference parameter adjusted based on the adjustment value. For example, the reference gain value of the bone conduction hearing aid to the sound signal and the reference analog output value of the bone conduction hearing aid may be adjusted by adjusting the current of an electromagnet in the magnetic circuit component, the resistance of an amplifier circuit of the sound pickup component, etc., to achieve the configuration of the bone conduction hearing aid.

In some embodiments, the bone conduction hearing aid may be configured based on the reference output parameter and the adjustment value at the each sound level in the each frequency band using an equalizing adjustment system (EQ system) or an automatic gain control system (AGC system), etc.

In other embodiments, the bone conduction hearing aid may be configured based on the reference output parameter and the adjustment value at the each sound level in the each frequency band using a multi-channel wide dynamic range compression system (WDRC system). The multi-channel wide dynamic range compression system can first divide the sound signal into a plurality of channels using a filter bank according to the frequency band, and compress the signal of each channel separately, so that an appropriate compression ratio and a compression threshold may be designed according to the hearing loss corresponding to the frequency band, and then the processed signals of each channel may be synthesized into one signal. The multi-channel wide dynamic range compression system may be more flexible for hearing compensation. In the multi-channel wide dynamic range compression system, the compression ratio and the compression threshold of the signal of each channel may be adjusted by adjusting each reference output parameter and adjustment value at the each sound level in the each frequency band, thereby adjusting the reference output parameter of each channel.

Figure 5:
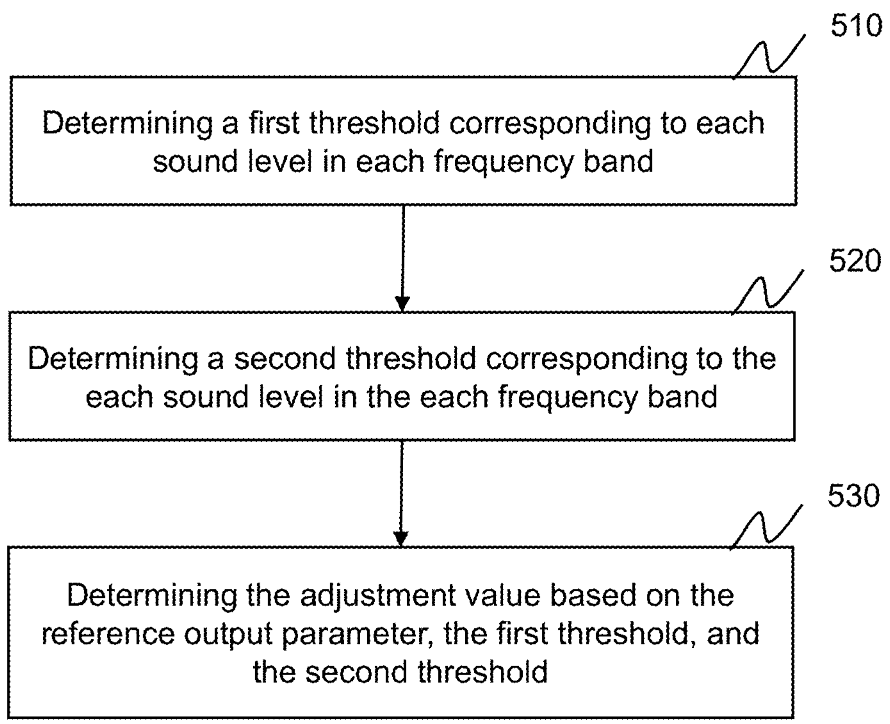
FIG. 5 is a flowchart illustrating an exemplary process for determining an adjustment value according to other embodiments of the present disclosure.

FIG. 5 is a flowchart illustrating an exemplary process for obtaining the adjustment value of the reference output parameter at the each sound level in the each frequency band. The adjustment value determined using the process in FIG. 5 may be related to the hearing level of the wearer. As shown in FIG. 5, the process 500 may include the following operations.

In 510, a first threshold corresponding to each sound level in each frequency band may be determined, wherein the first threshold may be related to a vibration degree that the wearer senses at the each sound level in the each frequency band.

The vibration degree that the wearer senses may be used to represent a vibration degree that the wearer senses when wearing the bone conduction hearing aid. In some embodiments, the vibration degree that the wearer senses may include a plurality of levels used to represent the vibration degree that the wearer senses. The higher the level, the greater the vibration degree that the user senses. In some embodiments, the levels may include a first level, a second level, a third level, a fourth level, and a fifth level, and the corresponding vibration degrees that the wearer senses may include "no vibration", "extremely slight vibration", "slight vibration", "obvious vibration, but acceptable", and "severe vibration, unacceptable". In some embodiments, different levels may be represented by scores. For example, the first level may be 1 point, the second level may be 2 points, the third level may be 3 points, the fourth level may be 4 points, and the fifth level may be 5 points.

In some embodiments, the first threshold may be an output signal intensity of the corresponding bone conduction hearing aid when the vibration degree that the wearer senses is below a certain level, i.e., when the output signal intensity of the bone conduction hearing aid reaches the first threshold, the wearer may sense the vibration at the level. For example, the first threshold may be the output signal intensity (i.e., the reference output parameter) of the bone conduction hearing aid when the vibration degree that the wearer senses is at the third level, i.e., when the output signal intensity of the bone conduction hearing aid reaches the first threshold, the wearer may feel the slight vibration corresponding to the third level. As another example, the first threshold may be the output signal intensity of the bone conduction hearing aid when the vibration degree that the wearer senses is at the fourth level, i.e., when the output signal intensity of the bone conduction hearing aid device reaches the first threshold, the wearer may feel the obvious but acceptable vibration corresponding to the fourth level. In some embodiments, when the output signal intensity of the bone conduction hearing aid is greater than the first threshold, the wearer may feel a stronger vibration than the vibration (e.g., the slight vibration corresponding to the third level) at the level corresponding to the first threshold, and poor wearing experience. Then the reference output parameter may be adjusted (reduced), to make the output signal intensity of the bone conduction hearing aid less than the first threshold.

In some embodiments, a preliminary reference output parameter corresponding to each sound level in each frequency band of the wearer of the bone conduction hearing aid may be obtained. Detailed descriptions regarding obtaining the reference output parameter may be found in 420 in FIG. 4. In some embodiments, the first threshold may be different for different wearers. For example, the output signal intensity and the corresponding vibration degree that the wearer senses at the each sound level in the each frequency band of the wearer of the bone conduction hearing aid under the preliminary reference output parameter may be determined by testing the wearer of the bone conduction hearing aid, and the output signal intensity and the vibration degree that the wearer senses may be adjusted by obtaining the reference output parameter by adjusting the preliminary reference output parameter, so that the vibration degree that the wearer senses may reach a certain level (e.g., the third level, slight vibration), and then the first threshold corresponding to the each sound level in the each frequency band may be determined. In some embodiments, the adjusted preliminary reference output parameter (i.e., the reference output parameter, such as the reference analog output value) may be equal to the adjusted signal output intensity. The first threshold may be equal to the adjusted output signal strength or the reference analog output value when the vibration degree that the wearer senses reaches a certain level (e.g., the third level, slight vibration).

In some embodiments, the first threshold may be the same for different wearers. For example, the first threshold may be specifically determined according to the following process: the signal output intensity of each tester when the tester subjectively senses the slight vibration of the second level at each sound level in each frequency band may be determined by testing a plurality of testers, and the signal output intensity may be used as test data; and the first threshold may be obtained by integrating and selecting the test data. This first threshold may be applicable to different wearers. In some embodiments, the integrating and selecting the test data may be as follows: for a certain frequency band, a minimum value of the output parameter when each tester subjectively senses the slight vibration at each sound level in the frequency band may be only considered, and the minimum value may be further selected from the minimum value of the output parameter when each tester subjectively senses the slight vibration at the each sound level in the frequency band as the first threshold value.

In some embodiments, the severe vibration of the bone conduction hearing aid may be more obvious in a low frequency band (e.g., the frequency band within a range of 0 Hz-625 Hz), and the adjustment value of the reference output parameter may be set in the low frequency band to reduce the reference output parameter and reduce the vibration intensity that the user senses. Correspondingly, the adjustment value of the reference output parameter may be determined based on the first threshold by setting the first threshold in the low frequency band (e.g., the frequency band within the range of 0 Hz-625 Hz). In some embodiments, the first threshold may be set in a frequency band within a range of 0 Hz-625 Hz, and the adjustment value may be determined in the frequency band. In some embodiments, the first thresholds corresponding to different frequency bands may be different. For example, in a frequency band within a range from 0 Hz to 125 Hz, the first threshold may be within a range of 48 dB-52 dB. In some embodiments, in a frequency band within a range from 125 Hz to 375 Hz, the first threshold may be within a range of 49 dB-54 dB. In some embodiments, in a frequency band within a range from 375 Hz to 625 Hz, the first threshold may be within a range of 50 dB-55 dB. In some embodiments, the higher the frequency band at the same sound level, the greater the first threshold.

In some embodiments, the first thresholds corresponding to different sound levels in a same frequency band may be the same. For example, a minimum value (e.g., 48 dB) within the range of the first threshold in the frequency band may be selected as the first threshold of the frequency band, so that the bone conduction hearing aid may not generate severe vibration when the received sound signals are at different sound levels in the same frequency band. For example, in a frequency band within a range from 0 Hz to 125 Hz, the first threshold may be 48 dB. In a frequency band within a range from 125 Hz to 375 Hz, the first threshold may be 49 dB. In a frequency band within a range from 375 Hz to 625 Hz, the first threshold may be 50 dB.

In some embodiments, the first thresholds corresponding to different sound levels in a same frequency band may be different. In some embodiments, the higher the sound level in the same frequency band, the greater the first threshold. For example, in a frequency band within a range from 0 Hz to 125 Hz, if the sound level is 20 dBC-40 dBC, the first threshold may be 48 dB; in the frequency band within the range from 0 Hz to 125 Hz, if the sound level is 40 dBC-50 dBC, the first threshold may be 49 dB; and in the frequency band within the range from 0 Hz to 125 Hz, if the sound level is 50 dBC-60 dBC, the first threshold may be 50 dB.

In some embodiments, the first thresholds corresponding to different hearing levels and different sound levels in the same frequency band may be the same. For example, a minimum value (e.g., 48 dB) within the range of the corresponding first threshold in the each frequency band may be selected as the first threshold, so that when the sound signal received by the bone conduction hearing aid is in the same frequency band, no matter what sound level the sound signal is and no matter what hearing level the wearer has, no relatively severe vibration may be generated.

In some embodiments, the first thresholds corresponding to different hearing levels and different sound levels in the same frequency band may be different. For example, in a frequency band within a range from 125 Hz to 375 Hz at a hearing level of 40 dBHL and a sound level of 60 dBC, the first threshold may be 49 dB. In the frequency band within the range from 125 Hz to 375 Hz at a hearing level of 10 dBHL and a sound level of 75 dBC, the first threshold may be 50 dB. As another example, in a frequency band within a range from 375 Hz to 625 Hz at a hearing level of 30 dBHL and a sound level of 70 dBC, the first threshold may be 55 dB. For example, in the frequency band within a range from 375 Hz to 625 Hz at a hearing level of 20 dBHL and a sound level of 75 dBC, the first threshold may be 56 dB. In some embodiments, the first thresholds corresponding to different sound levels and different hearing levels in different frequency bands may be the same. For example, a minimum value (e.g., 48 dB) within the range of the first thresholds corresponding to the frequency bands may be selected as the first thresholds corresponding to different sound levels in the frequency bands, so that the bone conduction hearing aid may not generate severe vibration when the received sound signals are at different sound levels in different frequency bands. For example, in a frequency band within a range from 0 Hz to 625 Hz, the first threshold may be 48 dB.

In 520, a second threshold corresponding to the each sound level in the each frequency band may be determined, wherein the second threshold may be related to a speech recognition rate of the wearer in the each frequency band.

The speech recognition rate (i.e., speech intelligibility) may be a ratio of understood or clearly understood words to heard words. The speech recognition rate may be used to represent a hearing sensitivity and a clarity of a language heard by the wearer wearing the hearing aid, and then reflect a hearing aid effect of the wearer to a certain extent. The higher the speech recognition rate, the higher the hearing sensitivity of the wearer after wearing the hearing aid, the higher the hearing clarity, and the better the hearing aid effect. In some embodiments, if the speech recognition rate is greater than or equal to 70%, it can be considered that the hearing aid effect is good; and if the speech recognition rate is less than or equal to 50%, it can be considered that the hearing aid effect may not be ideal, and the bone conduction hearing aid may be re-adjusted or configured.

In some embodiments, the adjustment (e.g., reduction) of the reference output parameter may affect the output signal intensity of the bone conduction hearing aid, which in turn may affect the speech recognition rate of the bone conduction hearing aid. For example, it can be known from the experimental results in FIGS. 9-11 that within a certain range (e.g., the range where the adjustment value is less than 17 dB), the higher the adjustment value, the lower the speech recognition rate may be. The second threshold may be used to ensure that the speech recognition rate adjusted by the reference output parameter may be within a certain range (e.g., higher than a certain threshold). That is to say, the second threshold may be used to control the reduction of the speech recognition rate adjusted by the reference output parameter within a certain range. For example, when the adjustment value does not exceed the second threshold, the reduction in the speech recognition rate of the wearer wearing the hearing aid may be small compared to the speech recognition rate unadjusted by the reference output parameter, e.g., the reduction in the speech recognition rate may be less than or equal to 5%. The reduction in the speech recognition rate may be a result of subtracting the speech recognition rate adjusted by the reference output parameter from the speech recognition rate unadjusted by the reference output parameter.

In some embodiments, the second threshold may be a maximum value of the adjustment value corresponding to the reference output parameter of the bone conduction hearing aid at the preset speech recognition rate when the wearer wears the bone conduction hearing aid, i.e., when the adjustment value corresponding to the reference output parameter of the bone conduction hearing aid reaches the second threshold, the speech recognition rate when the wearer wears the bone conduction hearing aid may be a preset threshold. When the adjustment value is greater than the second threshold, the speech recognition rate may be lower than a preset speech recognition rate when the wearer wears the bone conduction hearing aid.

For example, as shown in FIG. 10, the second threshold may be the adjustment value corresponding to the reference output parameter when the wearer wears the bone conduction hearing aid and the speech recognition rate is 80% at 125 Hz, i.e., the second threshold may be 5 dB. That is to say, when the adjustment value corresponding to the reference output parameter of the bone conduction hearing aid at 125 Hz is the second threshold, the speech recognition rate may be 80% when the wearer wears the bone conduction hearing aid. As another example, as shown in FIG. 11, the second threshold may be the adjustment value corresponding to the reference output parameter when the wearer wears the bone conduction hearing aid and the speech recognition rate is 60% at 250 Hz, i.e., the second threshold may be 12 dB. That is to say, when the adjustment value corresponding to the reference output parameter of the bone conduction hearing aid at 250 Hz is the second threshold, the speech recognition rate may be 60% when the wearer wears the bone conduction hearing aid.

In some embodiments, the second threshold may be determined according to a preset speech recognition rate threshold. For example, the second threshold may be determined based on the experimental results of a speech recognition rate test performed on the wearer in FIGS. 9-11. Merely by way of example, referring to FIG. 10, when the bone conduction hearing aid is configured based on the speech recognition rate unadjusted by the reference output parameter, the speech recognition rate of the wearer may be 80%, and if the speech recognition rate is set to be greater than or equal to 75% (i.e., the reduction in the speech recognition rate may be less than or equal to 5%) after the reference output parameter reduced, the second threshold may be 10 dB; and if the speech recognition rate is set to be greater than or equal to 80% (i.e., the speech recognition rate hardly reduces), the second threshold may be 5 dB.

In some embodiments, the severe vibration of the bone conduction hearing aid may be more obvious in a low frequency band (e.g., a frequency band within a range of 0 Hz-625 Hz), and the adjustment value of the reference output parameter may be set in the low frequency band, to reduce the reference output parameter and reduce the vibration intensity that the wearer senses. Correspondingly, the second threshold may be set in the low frequency band (e.g., the frequency band within the range of 0 Hz-625 Hz), to determine the adjustment value of the reference output parameter based on the first threshold. In some embodiments, second thresholds corresponding to different frequency bands may be different. For example, in a frequency band within a range from 0 Hz to 125 Hz, the second threshold may be within a range of 5 dB-10 dB. In some embodiments, in a frequency band within a range from 125 Hz to 375 Hz, the second threshold may be within a range of 3 dB-7 dB. In some embodiments, in a frequency band within a range from 375 Hz to 625 Hz, the second threshold may be within a range of 1 dB-4 dB. In some embodiments, the higher the frequency band at the same sound level, the smaller the second threshold.

In some embodiments, the second thresholds corresponding to different hearing levels in a same frequency band may be the same. For example, no matter whether the hearing level of the wearer is 30 dBHL or 40 dBHL, the second threshold may be set according to the above range. In some embodiments, the second thresholds corresponding to different hearing levels in the same frequency band may be different. For example, in a frequency band within a range from 0 Hz to 125 Hz, if the hearing level is 30 dBHL, the second threshold may be 5 dB. In the frequency band within the range from 0 Hz to 125 Hz, if the hearing level is 40 dBHL, the second threshold may be 15 dB. In some embodiments, the second thresholds corresponding to different sound levels in the same frequency band may be the same. In some embodiments, a minimum value within the above range may be selected as the second threshold, so that the bone conduction hearing aid may not affect the speech recognition rate too much when the received sound signals are at different sound levels. For example, in a frequency band within a range from 125 Hz to 375 Hz, the second threshold may be 3 dB. In some embodiments, in a frequency band within a range from 0 Hz to 125 Hz, the second threshold may be 5 dB. In some embodiments, in a frequency band within a range from 375 Hz to 625 Hz, the second threshold may be 1 dB.

In some embodiments, the second thresholds corresponding to different sound levels in the same frequency band may be different. For example, in a frequency band within a range from 0 Hz to 125 Hz, if the sound level is 60 dBC, and the second threshold may be 5 dB; and in the frequency band within the range from 0 Hz to 125 Hz, if the sound level is 60 dBC, the second threshold may be 10 dB.

In 530, the adjustment value may be determined based on the reference output parameter, the first threshold, and the second threshold.

In some embodiments, when the reference output parameter is greater than the first threshold, an initial adjustment value may be set first. The initial adjustment value may be determined based on experience or a preset formula. Then the initial adjustment value may be compared with the second threshold. If the initial adjustment value is greater than the second threshold, the initial adjustment value may be reduced, to make the initial adjustment value less than or equal to the second threshold. If the initial adjustment value is less than or equal to the second threshold, the initial adjustment value may be determined as the adjustment value.

In some embodiments, a comparison value may be obtained by subtracting the first threshold corresponding to a specific sound level in a specific frequency band from the reference output parameter corresponding to the specific sound level in the specific frequency band. Then a first comparison result may be obtained by comparing the comparison value with the second threshold corresponding to the specific sound level in the specific frequency band, and the adjustment value corresponding to the reference output parameter at the specific sound level in the specific frequency band may be determined based on the first comparison result.

The determination process of the first threshold and the second threshold may be found in the relevant descriptions above. The comparison value may be positive, negative, or zero. The comparing the comparison value with the second threshold may be a numerical comparison, to determine a magnitude relationship between the comparison value and the second threshold. The first comparison result may include that the comparison value is less than the second threshold, the comparison value is equal to the second threshold, or the comparison value is greater than the second threshold. The determining the adjustment value corresponding to the reference output parameter based on the first comparison result may be determining the adjustment value based on a magnitude relationship between the comparison value and the second threshold.

In some embodiments, the determining the adjustment value corresponding to the reference output parameter based on the first comparison result may include when the comparison value is less than or equal to 0, the adjustment value is 0; when the comparison value is greater than 0 and less than or equal to the second threshold, the adjustment value is the comparison value; and when the comparison value is greater than the second threshold, the adjustment value is the second threshold.

When the reference output parameter is less than or equal to the first threshold, after the bone conduction hearing aid is configured according to the reference output parameter, the wearer may be less likely to sense the vibration after wearing the bone conduction hearing aid, and the reference output parameter may not be adjusted. When the reference output parameter is greater than the first threshold, after the bone conduction hearing aid is configured according to the reference output parameter, the wearer may be more likely to sense a strong vibration after wearing the bone conduction hearing aid, and the reference output parameter may need to be adjusted. Furthermore, when determining the adjustment value, not only the risk of vibration of the bone conduction hearing aid brought by the reference output parameter may be considered, but also the effect of the adjusted reference output parameter on the speech recognition rate of the bone conduction hearing aid may be considered. As the second threshold is a threshold related to the speech recognition rate, by comparing the comparison value with the second threshold, the adjustment value may be less than or equal to the second threshold as much as possible, and the impact on the speech caused by the adjustment of the reference output parameter may be minimized.

Figure 6:
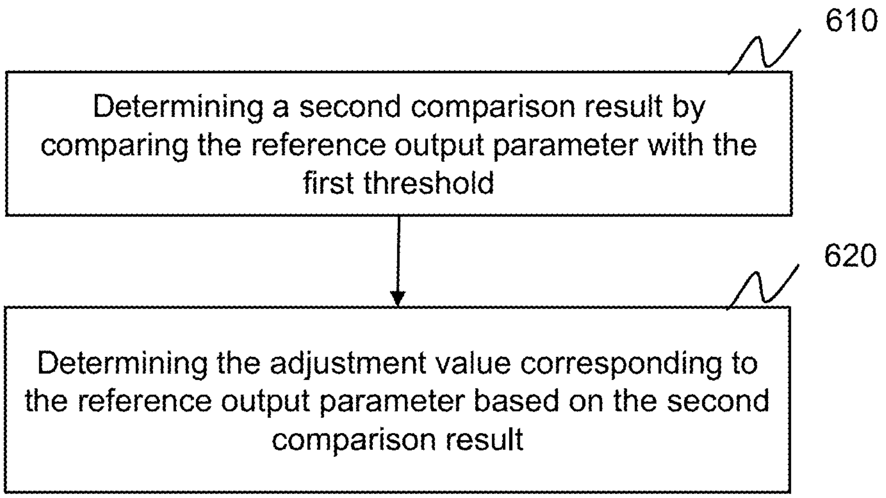
FIG. 6 is a flowchart illustrating an exemplary process for determining an adjustment value according to other embodiments of the present disclosure.

FIG. 6 is a flowchart illustrating an exemplary process for obtaining the adjustment value of the reference output parameter. In some embodiments, when the bone conduction hearing aid is configured using a multi-channel wide dynamic range compression system, the adjustment value corresponding to the reference output parameter may be determined using the process 600 in FIG. 6. As shown in FIG. 6, the process 600 for determining the adjustment value corresponding to the reference output parameter may include the following operations.

In 610, a second comparison result may be determined by comparing the reference output parameter with the first threshold. The first threshold may be related to a vibration degree that the wearer senses at each sound level in each frequency band.

The relevant descriptions regarding the first threshold and the process for determining the first threshold may be found in the relevant descriptions regarding the first threshold in 510. The comparing the reference output parameter with the first threshold may be a numerical comparison of the reference output parameter with the first threshold.

In 620, the adjustment value corresponding to the reference output parameter may be determined based on a second comparison result.

The relevant descriptions regarding the adjustment value corresponding to the output parameter may be found in the relevant descriptions in 430. The second comparison result may include comparison results that the reference output parameter is greater than the first threshold, the reference output parameter is equal to the first threshold, and the reference output parameter is less than the first threshold. In some embodiments, whether the adjustment value is 0 may be determined based on whether the reference output parameter is greater than the first threshold. For example, the adjustment value may be designated as 0 when the reference output parameter is less than the first threshold; and the adjustment value may be designated to be greater than 0 when the reference output parameter is greater than the first threshold.

In some embodiments, when the bone conduction hearing aid device is configured using the multi-channel wide dynamic range compression system, the adjustment value may include a gain reduction value of the multi-channel wide dynamic range compression system when at least one sound level of the each sound level is greater than a sound level threshold. In some embodiments, the sound level threshold may be 70 dB. When the wearer uses the bone conduction hearing aid, the sound level of a sound signal of a daily conversation may be generally about 60 dB. The sound level of the sound signal greater than or equal to 70 dBC may occur when the wearer speaks or the ambient sound is relatively loud. Then the bone conduction hearing aid may generate a relatively strong vibration, so the adjustment value may be set for adjusting (such as reducing) the reference output parameter within the range of the sound level, thereby improving the vibration of the bone conduction hearing aid, and making the speech recognition rate of the wearer almost unaffected in the daily conversation.

A gain when at least one sound level of the each sound level is greater than the sound level threshold may be referred to as a high level gain. The adjustment value may include a reduction value of the high level gain of the multi-channel wide dynamic range compression system. The high level gain of the multi-channel wide dynamic range compression system may be the gain when the sound level of the sound signal is greater than the sound level threshold (e.g., 70 dB). The gain of the multi-channel wide dynamic range compression system when at least one sound level of the each sound level is greater than the sound level threshold may be determined based on the hearing loss data of the wearer, e.g., may be determined according to an empirical formula. For example, the empirical formula may be to determine the high level gain of the multi-channel wide dynamic range compression system based on the hearing level of the wearer. The adjustment value may be a specific numerical value that reduces the high level gain derived from the empirical formula.

In some embodiments, whether the gain reduction value is 0 (i.e., whether to reduce the gain when the at least one sound level of the each sound level is greater than the sound level threshold) may be determined based on whether the reference output parameter is greater than the first threshold. For example, the gain reduction value may be designated as 0 when the reference output parameter is less than the first threshold; and the gain reduction value may be designated to be greater than 0 when the reference output parameter is greater than the first threshold.

In some embodiments, after determining the gain reduction value when the at least one sound level of the each sound level is greater than the sound level threshold, the gain value when the sound level is greater than the sound level threshold may be reduced using the gain reduction value, and the reduced gain value may be used as an input parameter of the multi-channel wide dynamic range compression system. When the at least one sound level of the each sound level is greater than the sound level threshold, the bone conduction hearing aid may be prone to vibration. The gain reduction value may be determined when the sound level is higher than the sound level threshold in the set frequency band according to the set method, and the gain reduction value is used as an adjustment value, ensuring that the reference output parameter may not be affected when the sound level of the sound signal is less than the sound level threshold, and when the sound level is less than the sound level threshold, the reference output parameter may be reduced. Therefore, while ensuring the speech recognition rate of the bone conduction hearing aid, the severe vibration of the bone conduction hearing aid in certain scenarios may be improved.

In some embodiments, when the adjustment value includes the gain reduction value of the multi-channel wide dynamic range compression system when the at least one sound level of the each sound level is greater than the sound level threshold, 620 may specifically include the following operations: designating the gain reduction value as 0 dB when the reference output parameter is less than or equal to the first threshold, and designating the gain reduction value as a difference between the first threshold and the reference output parameter when the reference output parameter is greater than the first threshold.

In this embodiment, if the reference output parameter is less than or equal to the first threshold, the wearer may be less likely to sense the severe vibration when wearing the bone conduction hearing aid, the high level gain may not be adjusted (reduced), and thus the high level gain reduction value may be set to 0. If the reference output parameter is greater than the first threshold, the wearer may be more likely to sense the severe vibration when wearing the bone conduction hearing aid, the high level gain may be adjusted (reduced), and thus the reference output parameter may be reduced, to make the reference output parameter less than the first threshold.

In some embodiments, when the bone conduction hearing aid is configured using the multi-channel wide dynamic range compression system, the adjustment value may include a reduction value of an output limit of the multi-channel wide dynamic range compression system when the at least one sound level of the each sound level is greater than the sound level threshold. In some embodiments, the sound level threshold may be 70 dB. In this embodiment, the situation that the sound level of the sound signal is greater than or equal to 70 dBC may occur when the wearer speaks or the ambient sound is relatively loud. At this time, the bone conduction hearing aid may generate a relatively strong vibration, so setting the adjustment value to adjust the reference output parameter (the output limit of the multi-channel wide dynamic range compression system) within this range of the sound level may improve the vibration of the bone conduction hearing aid, and make the speech recognition rate of the wearer hardly affected during the daily conversation.

The output limit may be understood as a limit value of the reference output parameter in the each frequency band. When the reference output parameter is greater than the output limit, the reference output parameter of the bone conduction hearing aid may be equal to the output limit. The output limit) of the multi-channel wide dynamic range compression system may be determined according to an empirical formula based on the hearing loss data of the wearer. For example, the empirical formula may be to determine the output limit) of the multi-channel wide dynamic range compression system based on the hearing level of the wearer. The adjustment value may be a specific numerical value that reduces the output limit derived from the empirical formula. The empirical formula may be set by the user or a default setting of the system for configuring the bone conduction hearing aid.

In some embodiments, when the adjustment value includes the reduction value of the output limit of the multi-channel wide dynamic range compression system when the at least one sound level of the each sound level is greater than the sound level threshold, operation 620 may further include the following operations: designating the reduction value of the output limit as 0 dB when the reference output parameter is less than or equal to the first threshold, and designating the reduction value of the output limit as a value greater than 0 dB when the reference output parameter is greater than the first threshold.

That is to say, if the reference output parameter is less than or equal to the first threshold, the wearer may be less likely to sense the severe vibration when wearing the bone conduction hearing aid, and the output limit may not be adjusted (reduced); and if the reference output parameter is greater than the first threshold, the wearer may be more likely to sense the severe vibration when wearing the bone conduction hearing aid, and the output limit may be adjusted (reduced), thereby reducing the reference output parameter, to make the reference output parameter less than the first threshold.

Further, when it is determined that the reduction value of the output limit is greater than 0, a specific numerical value of the reduction value of an output parameter limit may be further determined. In some embodiments, for example, the output limit may be gradually reduced in equal steps, to make the reference output parameter finally less than the first threshold. For example, the gradually reducing the output limit in equal steps may be reducing the output limit by a same value each time (e.g., reducing the output limit by 2 dB each time), to gradually reduce the reference output parameter, and finally make the reference output parameter less than the first threshold.

As the wearer generally senses a relatively strong vibration when the wearer speaks or the ambient sound is loud, the sound level at this time may be relatively large, e.g., greater than or equal to 70 dB. By using the process 600 and adjusting the reference output parameter, when a sound signal with an intermediate sound level (e.g., a sound signal with a sound level below 70 dB) is input into the bone conduction hearing aid, the reference output parameters of the bone conduction hearing aid may not be affected; while when a sound signal with a high sound level (e.g., a sound signal with a sound level of 70 dB and above) is input into the bone conduction hearing aid, the reference output parameter of the bone conduction hearing aid device may be less than the first threshold, thereby improving the situation that the wearer senses the relatively strong vibration when wearer speaks or the ambient sound is loud.

In some embodiments, the adjustment value may only include the gain reduction value when the at least one sound level of the each sound level is greater than the sound level threshold. In some other embodiments, the adjustment value may only include the reduction value of the output limit when the at least one sound level of the each sound level is greater than the sound level threshold. In some embodiments, the adjustment value may include both the gain reduction value when the at least one sound of the each sound level is greater than the sound level threshold, and the reduction value of the output limit when the at least one sound level of the each sound level is greater than the sound level threshold.

In some embodiments, setting parameters of the multichannel wide dynamic range compression system may further include a crossover frequency, a lower threshold, a low level gain, an upper threshold, an expansion threshold, an expansion ratio, a compressor attack, a compressor release, an automatic gain control algorithm according to the output (AGCo) attack, and an automatic gain control algorithm according to the output (AGCo) release. The crossover frequency may be a frequency at which an audio frequency spectrum is divided, i.e., a division point of each frequency band. The lower threshold may be a lower threshold of a sound level in a frequency band. The low level gain may be a gain when an input sound level is less than the lower threshold. The upper threshold may be an upper threshold of a sound level in the frequency band, i.e., a threshold corresponding to the high level gain. The expansion threshold may be an expansion threshold of a sound level in a frequency band, and the expansion ratio may be a gain ratio of a sound at the expansion threshold. The compressor attack may be a transition time when a compressor detects a sound higher than the threshold, and the compressor fully works, and a gain gradually increases to a preset gain within the transition time. The compressor release may be a transition time when the sound is lower than the threshold, and the compressor fully works, and the gain gradually decreases to the preset gain within the transition time. AGCo is an automatic gain control algorithm according to the output, and the AGCo attack may be 2 ms. The AGCo release time may be 64 ms.

Figure 7:
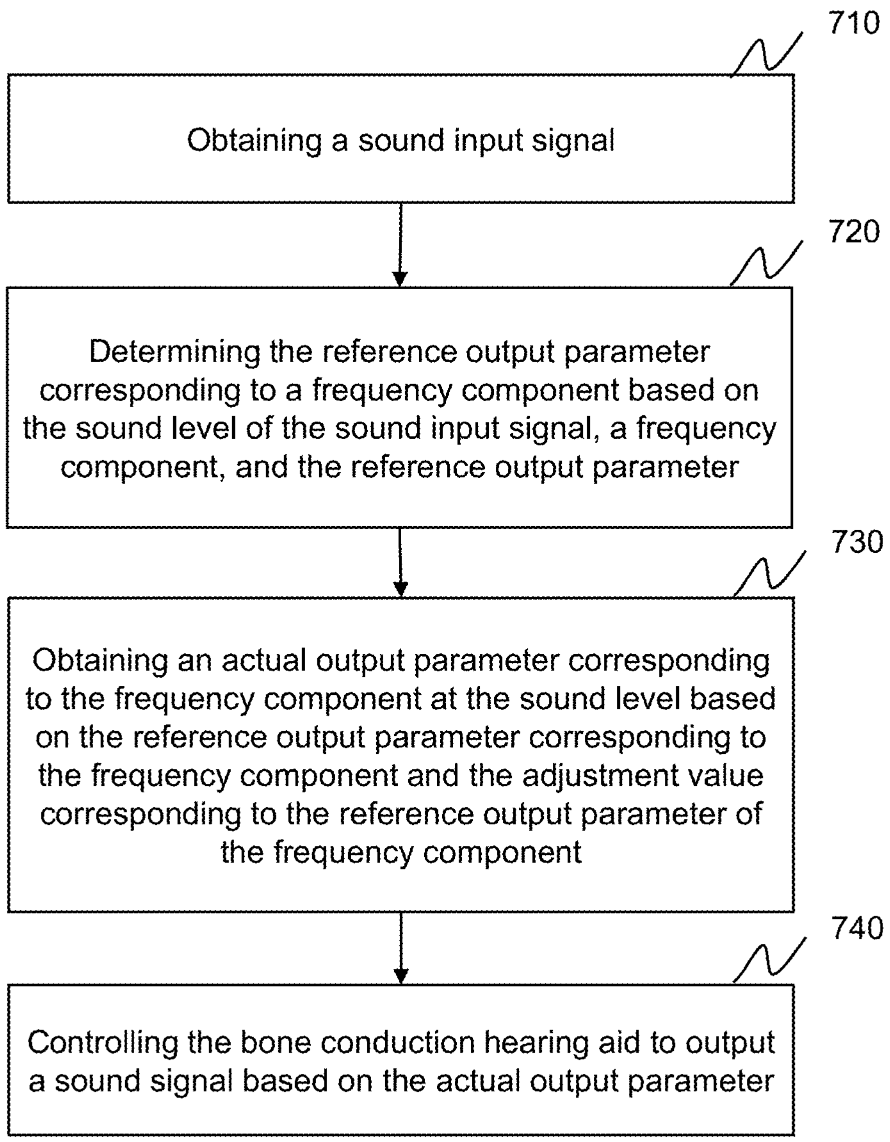
FIG. 7 is a flowchart illustrating operations performed by a bone conduction hearing aid during use according to some embodiments of the present disclosure.

FIG. 7 is a flowchart illustrating operations performed by a bone conduction hearing aid during use according to some embodiments of the present disclosure. As shown in FIG. 7, the bone conduction hearing aid may perform the following operations during use.

In 710, a sound input signal may be obtained. In some embodiments, the sound input signal may include an audio signal (e.g., song, voice, etc.) obtained by the bone conduction hearing aid from a storage device (e.g., the storage 130), a terminal (e.g., the terminal 140), or other devices. In some embodiments, the sound input signal of the bone conduction hearing aid may include a sound signal picked up by the sound pickup component of the bone conduction hearing aid. For example, the sound pickup component may pick up sound (the first vibration signal), and process the first vibration signal and convert the first vibration signal into an electrical signal. The electrical signal may be transmitted to the loudspeaker component of the bone conduction hearing aid. The loudspeaker component may be configured to process the electrical signal and convert the electrical signal into a second vibration signal based on the reference output parameter, and transmit the second vibration signal to the wearer.

In 720, the reference output parameter corresponding to a frequency component may be determined based on the sound level of the sound input signal, a frequency component, and the reference output parameter. In some embodiments, the bone conduction hearing aid may obtain preset reference output parameters stored in the storage device in the bone conduction hearing aid. The preset reference output parameter may correspond to different sound levels and hearing levels in different frequency bands. The bone conduction hearing aid may determine the reference output parameter corresponding to the sound level and the frequency component from the preset reference output parameters according to the sound level and the frequency component of the sound input signal. In some embodiments, the bone conduction hearing aid may determine the reference corresponding to the sound level, the frequency component and the hearing level from the preset reference output parameters according to the sound level, the frequency component and the hearing level of the sound input signal. In some embodiments, the preset reference output parameters corresponding to different sound levels and hearing levels in different frequency bands may be determined according to 420 in FIG. 4.

In 730, an actual output parameter corresponding to the frequency component at the sound level may be obtained based on the reference output parameter corresponding to the frequency component and the adjustment value corresponding to the reference output parameter of the frequency component. In some embodiments, the bone conduction hearing aid may obtain the adjustment values of the preset reference output parameters stored in the storage device of the bone conduction hearing aid. The preset adjustment values may correspond to reference output parameters at different sound levels and hearing levels in different frequency bands. The bone conduction hearing aid may determine the adjustment value of the reference output parameter corresponding to the sound level and the frequency component from the preset adjustment values according to the sound level and the frequency component of the sound input signal. In some embodiments, the bone conduction hearing aid may determine the adjustment value of the reference output corresponding to the sound level, frequency component and the hearing level from the preset adjustment values according to the sound level, the frequency component and the hearing level of the wearer of the sound input signal. In some embodiments, the adjustment values of the preset reference output parameters corresponding to different sound levels and hearing levels in different frequency bands may be determined according to 430 in FIG. 4.

In 740: the bone conduction hearing aid may be controlled to output a sound signal based on the actual output parameter.

The reference output parameter may be understood as a parameter that is initially set during the process of configuring the bone conduction hearing aid, and the actual output parameters may be understood as an output parameter adjusted by the bone conduction hearing aid based on the adjustment value. In some embodiments, the actual output parameter may include a gain value or an actual analog output value. In some embodiments, the actual gain value may be a value that the hearing aid actually amplifies the intensity of the sound signal during the wearing process, and the actual analog output value may be a value simulated by the hearing aid according to an input sound signal parameter (e.g., the sound signal intensity value). For example, the actual analog output value may be equal to a result of the sound signal input value (i.e., the intensity value, in dB) and the actual gain value (in dB). In some embodiments, the actual analog output value corresponding to a specific sound level and a specific frequency band may be equal to the actual output value (i.e., the actual output signal intensity value of the bone conduction hearing aid, in dB) during the use of the bone conduction hearing aid, e.g., when the input sound signal of the bone conduction hearing aid is at the specific sound level and the specific frequency band. In some embodiments, when the wearer wears the bone conduction hearing aid, the sound pickup component 220 of the bone conduction hearing aid may perform 710, and the magnetic circuit component of the bone conduction hearing aid may perform 720 and 730. The vibration component of the bone conduction hearing aid may perform 740. The vibration component may convert the actual output parameter a determined by the magnetic circuit component into corresponding vibration intensity, to make the bone conduction hearing aid output the sound signal through mechanical vibration. In some embodiments, when the wearer wears the bone conduction hearing aid, the sound pickup component 220 of the bone conduction hearing aid may perform 710, and the processing device of the bone conduction hearing aid may perform 720 and 730. The processing device of the bone conduction hearing aid may control the magnetic circuit component and the vibration component to perform 740. For example, the processing device may control the vibration component to generate a vibration intensity corresponding to the actual output parameter based on the determined actual output parameter, to make the bone conduction hearing aid output the sound signal through mechanical vibration. As another example, the processing device may control an intensity of the mechanical vibration generated by a voice coil by controlling a magnitude of the current in the voice coil based on the determined actual output parameter, to control the output signal intensity of the bone conduction hearing aid.

In some embodiments, the actual output parameter at each sound level in each frequency band may be stored in the bone conduction hearing aid. When the bone conduction hearing aid obtains the sound input signal, the bone conduction hearing aid device may directly determine the actual output parameters of the bone conduction hearing aid at the corresponding sound level in the frequency band based on the sound level in the frequency band of the sound input signal, and output the sound signal based on the actual output parameter.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures, or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for configuring a bone conduction hearing aid, comprising:

obtaining hearing loss data of a wearer;

determining, based on the hearing loss data, a reference output parameter of the bone conduction hearing aid at each sound level in each frequency band;

obtaining an adjustment value of the reference output parameter at the each sound level in the each frequency band, wherein the adjustment value is at least related to the frequency band; and configuring the bone conduction hearing aid based on the reference output parameter and the adjustment value at the each sound level in the each frequency band.

2. The method of claim 1, wherein the configuring the bone conduction hearing aid based on the reference output parameter and the adjustment value at the each sound level in the each frequency band includes:

in a frequency band within a range from 0 Hz to 625 Hz, reducing the reference output parameter based on the adjustment value.

3. The method of claim 1, wherein the adjustment values are the same at different sound levels in a same frequency band.

4. The method of claim 2, wherein in a frequency band within a range from 0 Hz to 625 Hz, the adjustment value is within a range of 1 dB-12 dB.

5. The method of claim 2, wherein, in a frequency band within a range from 0 Hz to 125 Hz, the adjustment value is within a range of 5 dB-12 dB;

in a frequency band within a range from 125 Hz to 375 Hz, the adjustment value is within a range of 3 dB-9 dB; or in a frequency band within a range from 375 Hz to 625 Hz, the adjustment value is within a range of 1 dB-6 dB.

6. The method of claim 2, wherein, in a frequency band within a range from 0 Hz to 125 Hz, the adjustment value is within a range of 5 dB-7 dB;

in a frequency band within a range from 125 Hz to 375 Hz, the adjustment value is within a range of 3 dB-5 dB; or in the frequency band within a range from 375 Hz to 625 Hz, the adjustment value is within a range of 1 dB-3 dB.

7. The method of claim 2, wherein, in a frequency band within a range from 0 Hz to 125 Hz, the adjustment value is within a range of 10 dB-12 dB;

in a frequency band within a range from 125 Hz to 375 Hz, the adjustment value is within a range of 7 dB-9 dB; or in a frequency band within a range from 375 Hz to 625 Hz, the adjustment value is within a range of 4 dB-6 dB.

8. The method of claim 1, wherein the adjustment values are different at different sound levels in a same frequency band.

9. The method of claim 8, wherein the obtaining the adjustment value of the reference output parameter at the each sound level in the each frequency band includes:

determining a first threshold corresponding to the each sound level in the each frequency band, wherein the first threshold is related to a vibration degree that the wearer senses at the each sound level in the each frequency band;

determining a second threshold corresponding to the each sound level in the each frequency band, wherein the second threshold is related to a speech recognition rate of the wearer at the each sound level in the each frequency band; and determining the adjustment value based on the reference output parameter, the first threshold, and the second threshold.

10. The method of claim 9, wherein the determining the adjustment value based on the reference output parameter, the first threshold, and the second threshold includes:

for a reference output parameter at a certain sound level of the each sound level in a certain frequency band of the each frequency band:

obtaining a comparison value by subtracting the first threshold from the reference output parameter;

obtaining a first comparison result by comparing the comparison value with the second threshold; and determining the adjustment value corresponding to the reference output parameter based on the first comparison result.

11. The method of claim 10, wherein the determining the adjustment value corresponding to the reference output parameter based on the first comparison result includes:

designating the adjustment value as 0 dB when the comparison value is less than or equal to 0;

designating the adjustment value as the comparison value when the comparison value is greater than 0 and less than or equal to the second threshold; and designating the adjustment value as the second threshold value when the comparison value is greater than the second threshold.

12. The method of claim 9, wherein in a frequency band within a range from 0 Hz to 125 Hz, the first threshold is within a range of 48 dB-52 dB;

in a frequency band within a range from 125 Hz to 375 Hz, the first threshold is within a range of 49 dB-54 dB; or in a frequency band within a range from 375 Hz to 625 Hz, the first threshold is within a range of 50 dB-55 dB.

13. The method of claim 9, wherein in a frequency band within a range from 0 Hz to 125 Hz, the second threshold is within a range of 5 dB-10 dB;

in a frequency band within a range from 125 Hz to 375 Hz, the second threshold is within a range of 3 dB-7 dB; or in a frequency band within a range from 375 Hz to 625 Hz, the second threshold is within a range of 1 dB-4 dB.

14. The method of claim 1, wherein the configuring the bone conduction hearing aid based on the reference output parameter and the adjustment value at the each sound level in the each frequency band includes:

configuring the bone conduction hearing aid based on the reference output parameter and the adjustment value at the each sound level in the each frequency band using a multi-channel wide dynamic range compression system.

15. The method of claim 14, wherein the obtaining the adjustment value of the reference output parameter at the each sound level in the each frequency band includes:

determining a second comparison result by comparing the reference output parameter with the first threshold, wherein the first threshold is related to a vibration degree that the wearer senses at the each sound level in the each frequency band; and determining the adjustment value corresponding to the reference output parameter based on the second comparison result.

16. The method of claim 15, wherein the adjustment value includes a gain reduction value of the multi-channel wide dynamic range compression system when at least one sound level of the each sound level is greater than a sound level threshold; and the determining the adjustment value corresponding to the reference output parameter based on the second comparison result includes:

designating the gain reduction value as 0 dB when the reference output parameter is less than or equal to the first threshold; and designating the gain reduction value as a difference between the first threshold and the reference output parameter when the reference output parameter is greater than the first threshold.

17. The method of claim 15, wherein the adjustment value includes a reduction value of an output limit of the multi-channel wide dynamic range compression system when at least one sound level of the each sound level is greater than a sound level threshold; and the determining the adjustment value corresponding to the reference output parameter based on the second comparison result includes:

designating the reduction value of the output limit as 0 dB when the reference output parameter is less than or equal to the first threshold; and designating the reduction value of the output limit as a value greater than 0 dB when the reference output parameter is greater than the first threshold.

18. A system for configuring a bone conduction hearing aid, comprising:

at least one storage device including a set of instructions; and at least one processor in communication with the at least one storage device, wherein when executing the set of instructions, the at least one processor is directed to cause the system to perform operations including:

obtaining hearing loss data of a wearer;

determining, based on the hearing loss data, a reference output parameter of the bone conduction hearing aid at each sound level in each frequency band;

obtaining an adjustment value of the reference output parameter at the each sound level in the each frequency band, wherein the adjustment value is at least related to the frequency band; and configuring the bone conduction hearing aid based on the reference output parameter and the adjustment value at the each sound level in the each frequency band.

19. A non-transitory computer-readable storage medium storing computer instructions that, when executed by at least one processor, direct the at least one processor to perform a method, the method comprising:

obtaining hearing loss data of a wearer;

determining, based on the hearing loss data, a reference output parameter of the bone conduction hearing aid at each sound level in each frequency band:

obtaining an adjustment value of the reference output parameter at the each sound level in the each frequency band, wherein the adjustment value is at least related to the frequency band; and configuring the bone conduction hearing aid based on the reference output parameter and the adjustment value at the each sound level in the each frequency band.

20. The system of claim 18, wherein the configuring the bone conduction hearing aid based on the reference output parameter and the adjustment value at the each sound level in the each frequency band includes:

in a frequency band within a range from 0 Hz to 625 Hz, reducing the reference output parameter based on the adjustment value.

* * * * *